United States Patent
Gonsa et al.

(10) Patent No.: US 8,355,353 B2
(45) Date of Patent: Jan. 15, 2013

(54) EFFICIENT MULTICAST SERVICE DATA PROVISION IN A MOBILE COMMUNICATION SYSTEM

(75) Inventors: Osvaldo Gonsa, Langen (DE); Ralf Becker, Langen (DE); Rolf Hakenberg, Langen (DE); Jose Luis Rey, Langen (DE)

(73) Assignee: Panasonic Corporation, Osaka (JP)

( * ) Notice: Subject to any disclaimer, the term of this patent is extended or adjusted under 35 U.S.C. 154(b) by 972 days.

(21) Appl. No.: 12/159,727

(22) PCT Filed: Jan. 18, 2007

(86) PCT No.: PCT/EP2007/000431
§ 371 (c)(1),
(2), (4) Date: Jul. 28, 2008

(87) PCT Pub. No.: WO2007/082752
PCT Pub. Date: Jul. 26, 2007

(65) Prior Publication Data
US 2009/0010195 A1    Jan. 8, 2009

(30) Foreign Application Priority Data
Jan. 18, 2006    (EP) .................................... 06001019

(51) Int. Cl.
*H04H 20/71* (2008.01)
*H04L 12/28* (2006.01)
*H04J 3/26* (2006.01)
(52) U.S. Cl. .................... 370/312; 370/390; 370/432
(58) Field of Classification Search .................... None
See application file for complete search history.

(56) References Cited

U.S. PATENT DOCUMENTS

| | | | |
|---|---|---|---|
| 2004/0087319 A1* | 5/2004 | Bos et al. ..................... 455/458 |
| 2004/0151133 A1 | 8/2004 | Yi |
| 2005/0068963 A1* | 3/2005 | Lee et al. ................... 370/395.3 |
| 2005/0243721 A1* | 11/2005 | Cai et al. ....................... 370/230 |
| 2006/0034202 A1* | 2/2006 | Kuure et al. .................. 370/312 |
| 2006/0229082 A1* | 10/2006 | Terry ............................. 455/450 |
| 2008/0232292 A1* | 9/2008 | Zhang ........................... 370/312 |

FOREIGN PATENT DOCUMENTS

EP    0 805 576    11/1997

(Continued)

OTHER PUBLICATIONS

International Search Report dated May 8, 2007.

(Continued)

*Primary Examiner* — Chirag G Shah
*Assistant Examiner* — Srinivasa Reddivalam
(74) *Attorney, Agent, or Firm* — Dickinson Wright PLLC

(57) ABSTRACT

The invention relates to a method for efficiently setting up a bidirectional multicast service in a mobile communication system. The bidirectional service is provided to a user equipment located in a radio cell controlled by a control entity. For the downlink data of the bidirectional service a downlink multicast service framework is utilized. In case the control entity decides for a point-to-point radio link to the UE, the system resources of the downlink framework are configured so as to re-use the configured system resources of the bidirectional service. This includes radio resources in the radio access network and may include tunnels in the core network. The invention further relates to a network entity in the CN or in the RAN for configuring system resources and for forwarding the multicast service data to the UE. The invention also relates to a mobile terminal for receiving the bidirectional multicast service.

38 Claims, 11 Drawing Sheets

FOREIGN PATENT DOCUMENTS

| | | |
|---|---|---|
| EP | 1 562 344 | 8/2005 |
| WO | 2005/081569 | 9/2005 |
| WO | 2006/016003 | 2/2006 |

OTHER PUBLICATIONS

3GPP Group Services and System Aspects: "TR 23.979 V1.1.0:3GPP Enablers for OMA PoC Services," 3GPP TR 23.979 V1.1.0, Aug. 2004, page complete, XP002321832 p. 24-p. 29.

ETSI Standards, European Telecommunications Standards Institute: "Digital cellular telecommunications system (Phase 2+); Universal Mobile Telecommunications System (UMTS); Conferencing using the IP Multimedia (IM); Core Network (CN) subsystems; Stage 3," ETSI TS 124 147 V6.3.0, vol. 3-CN1;3-CT1, No. V630, Jun. 2005, XP014030516 Sophia-Antipo, FR ISSN: 0000-0001 paragraph [0004] paragraph [6.3.2] paragraph [A.3.2.1]—paragraph [A.4.2.1.1].

* cited by examiner

EFFICIENT MULTICAST SERVICE DATA PROVISION IN A MOBILE COMMUNICATION SYSTEM

FIELD OF THE INVENTION

The invention relates to a method for setting up a bidirectional multicast service in a mobile communication system. The invention further relates to a network entity in the core network or in the radio access network for configuring system resources in the mobile communication system and for forwarding the multicast service data to the mobile terminal. The invention also relates to a mobile terminal for receiving the bidirectional multicast service.

TECHNICAL BACKGROUND

Mobile communication systems, such as the universal mobile telecommunications system (UMTS) can carry both voice and data traffic via fixed, wireless and satellite networks. These communication systems are incessantly evolving, thereby also developing and providing packet frameworks for the delivery of IP based, real-time, conversational or multimedia services. For instance, an IP multimedia subsystem (IMS) standard is specified by the 3rd Generation Partnership Project (3GPP) (see 3GPP TS 23.228 v6.9.0: "IP Multimedia Subsystem (IMS); Stage 2 (Release 6)", incorporated herein by reference, available from http://www.3gpp.org). IMS is specifically architected to enable and enhance real time, mobile and fixed multimedia mobile services such as rich voices services, video telephony, messaging, conferencing and push services. IMS runs over the standard Internet Protocol (IP) and supports both packet-switched and circuit-switched phone systems.

Typically, multiple users are subscribed to receive IMS services, such as Push to Talk over Cellular (PoC) or Videoconferencing services, which occasionally includes providing the same data to multiple users in a specific cell of a radio network. IMS standards however only support point-to-point (PTP) connections to the mobile terminals (MT) of the users, including the reservation of system resources in the radio access network (RAN) for dedicated radio bearer connectivity to each mobile terminal provided with the service.

In cases where multiple users receive the same service, it can be advantageous to use a multicast capable service with a point-to-multipoint (PTM) capability to transmit the service data to the multiple users. When providing IMS services in an UMTS system, typically, shared or broadcast radio bearers instead of many dedicated radio bearers are utilized to serve multiple users in a radio cell, which may save system resources in the radio access network.

A multicast capable service is for example the Multimedia Broadcast/Multicast Service (MBMS), which has also been standardized by the 3GPP (see 3GPP TS 23.246 v6.6.0: "Multimedia Broadcast/Multicast Service (MBMS); Architecture and functional description (Release 6)", incorporated herein by reference, available from http://www.3gpp.org). The MBMS service is a downlink multicast service for transmitting the same downlink data to a plurality of recipients through a radio network. The recipients typically share one radio channel, a shared radio bearer for the reception of MBMS service data. The MBMS service supports the transmission of multimedia data such as real-time image and voice or text. It may therefore also be used to provide data of IMS services to the users. As the same data is transmitted to many users probably located in different cells, the type of connection, PTP or PTM, used in a cell for a specific mobile terminal of the user is based on the number of users located in each cell.

In the following, an exemplary setup procedure for such an IMS service using the MBMS service framework for downlink data provision as described in 3GPP TSG-SA WG2 #48, S2-052305, Sophia Antipolis, France 5-9 Sep. 2005, "Enable IMS service with multicast capability" (incorporated herein by reference, available at http://www.3gpp.org/ftp/tsg_sa/WG2_Arch/TSGS2__48-Sophia_Antipolis/Docs/) is briefly discussed in the following.

First, the user subscribes to an IMS service by sending a INVITE message to the service provider via the radio access network and the core network. After authorizing the user to receive the service, the service provider initiates the reservation of system resources in the mobile communication system, including the setting up of tunnels between a Gateway GPRS support node (GGSN)—Service GPRS support node (SGSN) and a radio network controller (RNC), for controlling radio transmission resources in the RAN. Furthermore, a radio bearer between the RNC and the user equipment (UE) is established for the signalling and the uplink connection from the UE to the service provider. For communicating, session setup signalling, session setup and control protocols as SIP (Session Initiation Protocol) are used.

To provide the downlink data to the users, the MBMS service framework is utilized. The setup procedure of the MBMS service can be initiated for example by the IMS service provider. The MBMS setup also includes the configuration of system resources for the transmission of the downlink IMS data. Accordingly, this setup typically comprises the establishment of tunnels between GGSN, SGSN and RNC, described by contexts established in the respective network nodes and further comprises the setup of a shared or dedicated radio bearer in the RAN, depending on the users located in the cell to receive the IMS service.

SUMMARY OF THE INVENTION

The object of the invention is to enable an efficient setup of a bidirectional multicast service using a downlink multicast service framework for downlink service data provision of the bidirectional multicast service.

The object is solved by the subject matter of the independent claims. Advantageous embodiments of the invention are subject-matters of the dependent claims.

One aspect of the invention is to reuse already established system resources for downlink service data transmission. During setup procedure a radio bearer is established for the bidirectional service first service. In case downlink service data is to be provided via a PTP connection to a mobile terminal, the already established radio bearer is used by a downlink multicast service framework to deliver the downlink service data, instead of allocating additional system resources to the downlink multicast service framework for downlink data transmission.

According to an embodiment of the invention, a method for setting up a bidirectional multicast service from a multicast service provider to a mobile terminal within a mobile communication system is provided. The mobile communication system comprises a core network and a radio access network. In the mobile communication system downlink multicast service data of said bidirectional multicast service is to be provided to the mobile terminal utilizing a downlink multicast service framework. According to the method, system resources of the mobile communication system for the transmission of multicast service data of the bidirectional multicast service are configured. The configuration may comprise the establishment of a bidirectional radio bearer between the mobile terminal and a control entity controlling radio resources of the radio access network. Further, it is decided whether to utilize point-to-point connection on the radio access network for providing the downlink multicast service data of the multicast service to the mobile terminal. In case it has been decided to utilize a point-to-point connection system resources of the downlink multicast service framework are configured for the transmission of the downlink multicast service data to utilize the established radio bearer for providing the downlink multicast service data to the mobile terminal.

In another embodiment of the invention the configuration of system resources for the transmission of the bidirectional multicast service further includes the establishment of a connection between a network entity in the core network and the control entity in the radio access network.

According to a variation of this embodiment, the configuration of system resources for the downlink transmission is effected by the network entity of the core network.

In a further embodiment of the invention, the configuration of system resources for the downlink transmission further allows to utilize the established connection between the network entity and the control entity for providing the downlink multicast service data.

Still in another embodiment of the invention, the bidirectional multicast service is assigned a multicast service identifier. This identifier may advantageously enable an identification of the multicast service amongst other multimedia services.

According to an additional embodiment of the invention, the multicast service identifier is an Access Point Name or an IP multicast address. Using the access point name and the IP multicast address of the multicast service as the multicast service identifier may have the advantage that they are typically available throughout the entities in the mobile communication system.

In a variation of the embodiment of the invention, the configuration of system resources for the multicast service data of the bidirectional multicast service further includes activating a context for multicast service related control signaling and for multicast service data transfer at least in a network entity of the core network. The context may include routing information on the routing of the multicast service data in the configured system resources to provide the multicast service from the multicast service provider to the mobile terminal. The context may also include a multicast service identifier that identifier the bidirectional multicast service.

According to another embodiment of the invention, the configuration of system resources for the data of the bidirectional multicast service further includes activating a control signaling context for multicast service related control signaling comprising routing information on the routing of control signaling in the configured system resources and including a multicast service identifier. A data context for multicast service data transfer may include routing information on the routing of multicast service data provided from the multicast service provider to the mobile terminal in the configured system resources, which are being identified by a resource identifier. The data context may further include a multicast service identifier at least in a network entity of the core network.

In a further embodiment of the invention, the configuration of the system resources for the downlink service data includes activating a mobile terminal related context of the downlink multicast service framework at least in a network entity of the core network. The mobile terminal related context may include information on the downlink multicast services the mobile terminal is registered to. Further, it may optionally include information on the mobile terminal.

According to another embodiment of the invention, the method further identifies the mobile terminal, which is provided with the bidirectional multicast service and uses the downlink multicast service framework for provision of the downlink multicast service data. The identification may be done for example by comparing the multicast service identifier comprised in the control signaling context and the mobile related context.

Another embodiment of the invention suggests to identify the system resources used for the multicast service data of the bidirectional multicast service.

In a further embodiment of the invention a network entity of the core network identifies system resources configured for the multicast service data of the bidirectional multicast service and utilizing the bidirectional radio bearer of the identified system resources for providing the downlink multicast service data.

In a variation of the embodiment of the invention a connection between the network entity in the core network and the control entity of the radio access network may be utilized for providing the downlink multicast service data, which may include the reuse of the connections between the entities of the core network and the control entity of the radio access network.

In another embodiment of the invention the method further comprises identifying the system resources utilized for the multicast service data of the bidirectional multicast service based on the resource identifier of the data context of the bidirectional multicast service.

According to another embodiment of the invention, the multicast service identifier is unique to a multicast service utilizing the downlink multicast service framework for providing the downlink multicast service data. By defining a unique multicast service identifier, specifically for the bidirectional multicast service over the downlink multicast service framework, no comparison is necessary to identify the bidirectional multicast service.

A variation of the embodiment of the invention further identifies the mobile terminal, which is provided with the multicast service by means of the unique multicast service identifier.

In a further embodiment of the invention the decision whether to utilize a point-to-point connection is made by the control entity. The control entity for controlling the radio resources of the radio access network may be informed by the network entity in the core network on the specific mobile terminal having requested the multicast service. Furthermore, a notification message is transmitted to the network entity in the core network to inform the network entity on the decision to utilize the point-to-point connection. The notification message comprises information on the mobile terminal to be utilizing the point-to-point connection and information on the bidirectional multicast service to be provided to the mobile terminal.

According to another embodiment of the invention, the connection between the network entity of the core network and the control entity is a tunnel. The respective endpoints of the tunnel are identified by a tunnel endpoint identifier included in a context for the multicast service data transfer.

In a further embodiment of the invention the configuration of system resources for downlink multicast service data includes associating the tunnel endpoint identifier of the established tunnel to the downlink multicast service data. By associating the tunnel endpoint identifier to the downlink service data, an indirect link to the established radio bearer may be achieved and the already established radio bearer may be used for transmission of the downlink multicast service data.

According to another embodiment of the invention, the network entity is a gateway GPRS support node or a serving GPRS support node in the core network.

In a variation of the embodiment of the invention the configuration of system resources for downlink transmission on the radio access network is effected by the control entity controlling radio resources of the radio access network.

According to another embodiment of the invention, the established radio bearer is addressed by a radio bearer identifier and the configuration of system resources for downlink transmission includes assigning the radio bearer identifier to the downlink multicast service data.

In another embodiment of the invention the bidirectional multicast service is provided to further mobile terminals within the mobile communication system. Thereby, the downlink multicast service framework is utilized for providing the downlink multicast service data to the further mobile terminals. System resources are configured for transmission of multicast service data of said multicast service to the further mobile terminals. Downlink multicast service data is transmitted to the further mobile terminals via the system resources configured for the further mobile terminals and the downlink multicast service data is also transmitted to the mobile terminal via the system resources configured for the mobile terminal.

In a variation of the embodiment of the invention the configured system resources for the further mobile terminals include a tunnel between a network entity of the core network and the control entity of the radio access network, and a point-to-multipoint connection between the control entity and the further mobile terminals in the radio access network.

According to a further embodiment of the invention, the configured system resources for the further mobile terminals include a point-to-multipoint connection between the control entity and the further mobile terminals in the radio access network. This embodiment enables the provision of the same multicast service data via a point-to-multipoint and a point-to-point connection to the users.

In a further embodiment of the invention the multicast service is identified by a multicast service identifier. An activation message is transmitted from the mobile terminal to a downlink multicast service server for activating a downlink multicast service to be used for the transmission of downlink multicast service data to the terminal. Thereby, the system resources configured for the multicast service data of the bidirectional multicast service are utilized.

Another embodiment of the invention suggests to authorize the mobile terminal to receive the downlink multicast service data at the downlink multicast service server. If the authorization is successful, a notification including the multicast service identifier of the multicast service, for identifying the system resources configured for the transmission of service data of the bidirectional multicast service is received by a network entity of the core network.

According to a further embodiment of the invention, a control signaling context for multicast service related control signaling, including routing information on the routing of control signaling in the configured system resources is used to identify the connection via which the activation message from the mobile terminal to the downlink multicast service server is transmitted. Alternatively, a data context for multicast service data transfer, including routing information on the routing of multicast service data provided from the multicast service provider to the mobile terminal in the configured system resources may be used to identify the connection via which the activation message from the mobile terminal to the downlink multicast service server is transmitted. Already available system resources may be used for the transmission of the activation message, so that no additional resources need be reserved.

In a variation of the embodiment of the invention, the mobile terminal is located in a source cell, and the multicast service is provided to further mobile terminals within the mobile communication system, located in a target cell. In the target cell system resources are configured for providing service data of the bidirectional multicast service to the further mobile terminals. When handing over the mobile terminal from the source cell to the target cell the configured system resources of the target cell are utilized for providing the multicast service to the mobile terminal, and the configured system resources configured for the mobile terminal in the source cell may be released.

In another embodiment, the configured system resources in the target cell include an established point-to-multipoint connection between a control entity of the radio access network and the further mobile terminals. Furthermore, the utilization of the configured system resources in the target cell comprises transmitting the downlink multicast service data to the mobile terminal via the established point-to-multipoint connection for the further mobile terminals. The control entity of the radio access network may be further notified to release the configured radio bearer for the mobile terminal in the source cell.

In another variation of the embodiment, the configured system resources in the target cell include an established connection between a network entity of the core network and the control entity of the radio access network and a point-to-multipoint connection between the control entity of the radio access network and the further mobile terminals. Furthermore, utilizing the configured system resources in the target cell comprises transmitting the downlink multicast service data to the mobile terminal utilizing the established connection and the established point-to-multipoint connection for the further mobile terminals. In addition, the network entity of the core network may be notified to release a configured connection between the network entity and the control entity for the mobile terminal in the source cell. The control entity of the radio access network may also be notified that it can release the configured radio bearer for the mobile terminal in the source cell.

The invention according to another embodiment provides a network entity located in a radio access network in a mobile communication system for configuring system resources. Downlink multicast service data of a bidirectional multicast service is to be provided to the mobile terminal utilizing a downlink multicast service.

The network entity comprises a processor to configure system resources of the mobile communication system for the transmission of multicast service data of the bidirectional multicast service from a multicast service provider to a mobile terminal. The configuration may comprise the establishment of a bidirectional radio bearer between the mobile terminal and a control entity controlling radio resources of the radio access network.

The processor is further adapted to decide whether to utilize point-to-point connection on the radio access network for providing the downlink multicast service data of the multicast service to the mobile terminal. Additionally, the network entity comprises a receiver to receive downlink multicast service data and forwards it through the established radio bearer, in case it has been decided to utilize the point-to-point connection.

A network entity located in a core network of a mobile communication system for configuring system resources is further provided in another embodiment of the invention, said network entity being part of. Downlink multicast service data of a bidirectional multicast service is to be provided to the mobile terminal utilizing a downlink multicast service. The network entity comprises a processor to configure system resources of the mobile communication system for the transmission of multicast service data of the bidirectional multicast service from a multicast service provider to a mobile terminal. This configuration may comprise the establishment of a tunnel between the network entity and a control entity controlling radio resources of the radio access network.

The network entity may further comprise a transmitter for requesting the control entity of the radio access network to reserve system resources for the establishment of a radio bearer between the control entity and the mobile terminal for the transmission of multicast service data of the bidirectional multicast service. The processor informs the control entity for controlling the radio resources of the radio access network on the mobile terminal having requested the multicast service.

Furthermore, the network entity may comprise a receiver to receive a notification message from the control entity in the radio access network, informing the network entity on whether to utilize the point-to-point connection. The notification message comprises an identification of the mobile terminal to be utilizing the point-to-point connection and an identification of the bidirectional multicast service. In addition, the receiver is further adapted to receive downlink multicast service data and forward it through the established tunnel of the multicast service, for utilizing the established radio bearer, in case it has been decided to utilize the point-to-point connection.

Another embodiment of the invention is related to a network entity located in a radio access network of a mobile communication system for configuring system resources. The configured system resources are utilized for setting up a bidirectional multicast service from a multicast service provider to a mobile terminal. Downlink multicast service data of said bidirectional multicast service is to be provided to the mobile terminal utilizing a downlink multicast service framework.

The network entity comprises a processor to configure system resources of the mobile communication system for the transmission of multicast service data of the bidirectional multicast service from a multicast service provider to a mobile terminal. This configuration comprises the establishment of a radio bearer to the mobile terminal. The network entity may further comprise a receiver to receive a notification from a network entity of a core network in the mobile communication system, including information on the mobile terminal having requested the multicast service.

The processor may be adapted to decide whether to utilize the point-to-point connection on the radio access network for providing the downlink multicast service data to the mobile terminal. A transmitter may be included in the network entity to transmit a notification to the network entity. The notification message may comprise an identification of the mobile terminal to be utilizing the point-to-point connection and an identification of the multicast service. The network entity's receiver may be further adapted to receive the downlink multicast service data and forward it through the established radio bearer of the multicast service, in case it has been decided to utilize the point-to-point connection.

A further embodiment of the invention provides a mobile terminal within a mobile communication system to be participating in a bidirectional multicast service provided by a multicast service provider. In the mobile communication system downlink multicast service data of said bidirectional multicast service is to be provided to the mobile terminal utilizing a downlink multicast service.

The mobile terminal comprises a processor to configure system resources in the mobile communication system, including a radio bearer to a control entity in the radio access network, for the transmission and reception of service data of the bidirectional multicast service. The processor may further configure system resources in the mobile communication system for the reception of downlink multicast service data through the downlink multicast service. The mobile terminal further comprises a receiver to receive downlink service data of the bidirectional multicast service through the established radio bearer, in case a point-to-point connection is established in the radio access network.

BRIEF DESCRIPTION OF THE FIGURES

In the following the invention is described in more detail in reference to the attached figures and drawings. Similar or corresponding details in the figures are marked with the same reference numerals.

DETAILED DESCRIPTION OF THE INVENTION

Figure 1:
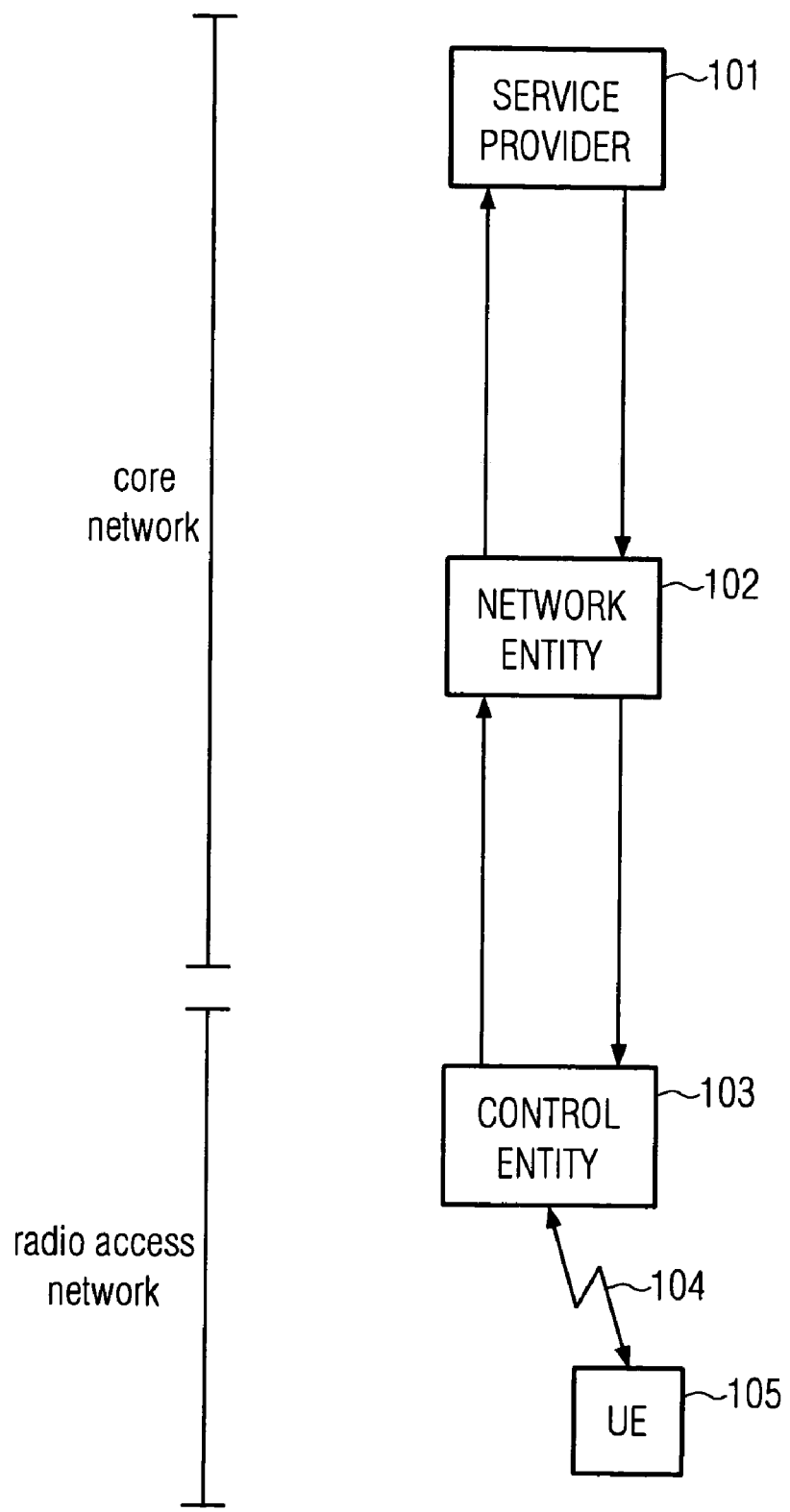
FIG. 1 shows a mobile communication system according to one embodiment of the invention.

The following paragraphs will describe various embodiments of the invention. For exemplary purposes only, most of the embodiments are outlined in relation to an UMTS communication system and the terminology used in the subsequent sections mainly relates to the UMTS terminology. However, the terminology and the description of the embodiments with respect to an UMTS architecture is not intended to limit the principles and ideas of the inventions to such systems.

Also the detailed explanations given in the Technical Background section above are merely intended to better understand the mostly UMTS specific exemplary embodiments described in the following and should not be understood as limiting the invention to the described specific implementations of processes and functions in the mobile communication network.

According to the invention, a radio bearer may be defined as a logical connection between a control entity in the radio access network and one or a plurality of user terminals. Furthermore, the radio bearer may be dedicated, in which case a point-to-point (PTP) connection is established to the one user terminal. Alternatively, the radio bearer may be a point-to-multipoint (PTM) connection, wherein the radio bearer may be shared by a plurality of user terminals in the same radio cell. A context may be defined as a set of information, which is established in the network nodes of the communication system for the purpose of defining system resources, which are to be used for the transmission of service data. A network entity may be defined as an entity of the core network in a mobile communication system which serves as an entry point for the service data from a service provider and forwards the service data to further entities in the mobile communication system. For example, in a standard UMTS implementation a network entity could be a Gateway GPRS support node (GGSN) or a Service GPRS support node (SGSN). Moreover, according to other implementations a network entity could be a gateway.

Moreover, a control entity may be defined as an entity of the radio access network in the mobile communication system, which controls radio resources in the radio access network. In a typical UMTS implementation the control entity could be a Radio Network Controller (RNC) or a Node B. The control entity is typically responsible for setting up radio bearers to the mobile terminals under its control.

The configuration of system resources in the mobile communication system may be defined as the establishment of necessary connections between the user terminal and the service provider. In the radio access network a radio bearer is configured and subsequently, the necessary resources of the RAN are explicitly reserved for this radio bearer. In the control network the configuration of system resources may include connections between the network entity of the core network and the control entity of the RAN. In a typical UMTS implementation the configured system resources in the core network may comprise tunnels between the SGSN and the GGSN and between the SGSN and the RNC. During the configuration of tunnels in the core network, system resources may or may not be explicitly reserved for the particular tunnels.

FIG. 1 shows a mobile communication system according to one embodiment of the invention. A service provider 101 provides a bidirectional multicast service to a UE 105 via a network entity 102 and a control entity 103. The bidirectional multicast service is defined by providing service data to multiple user equipments and further receive data from the user equipments, registered to the bidirectional multicast service. The network entity 102 is part of the core network of a mobile communication system. The control entity 103 is part of the radio access network (RAN) of a mobile communication system and controls the radio resources in the RAN. System resources are configured for the transmission of service data for the bidirectional multicast service, which comprises the establishment of a bidirectional radio bearer 104 from the control entity 103 to the UE 105. For the transmission of downlink data of the bidirectional multicast service to the UE 105 a downlink multicast service framework is utilized.

The configuration of the system resources regarding the downlink multicast service framework for the downlink provision depends on the decision of the control entity whether to use a PTP or PTM connection to the UE 105. According to the embodiment of the invention, in case the control entity 103 decides for a PTP connection, the system resources for the downlink are configured so as to use the already established radio bearer 104 of the bidirectional multicast service setup for the provision of the downlink service data of the bidirectional multicast service, instead of establishing a new radio bearer.

Moreover, in another embodiment of the invention a connection between the network entity 102 and the control entity 103 is set-up for the bidirectional multicast service. The configuration of the downlink multicast service framework may be conducted in the network entity, which would enable the re-use of the connection between the control entity and the network entity, as well as the radio bearer 104.

According to the above, two data paths are defined from the service provider 101 to the UE 105, one for uplink data and one for downlink data. In the RAN however, the two data paths are composed of a single bidirectional radio connection 104.

Figure 10:
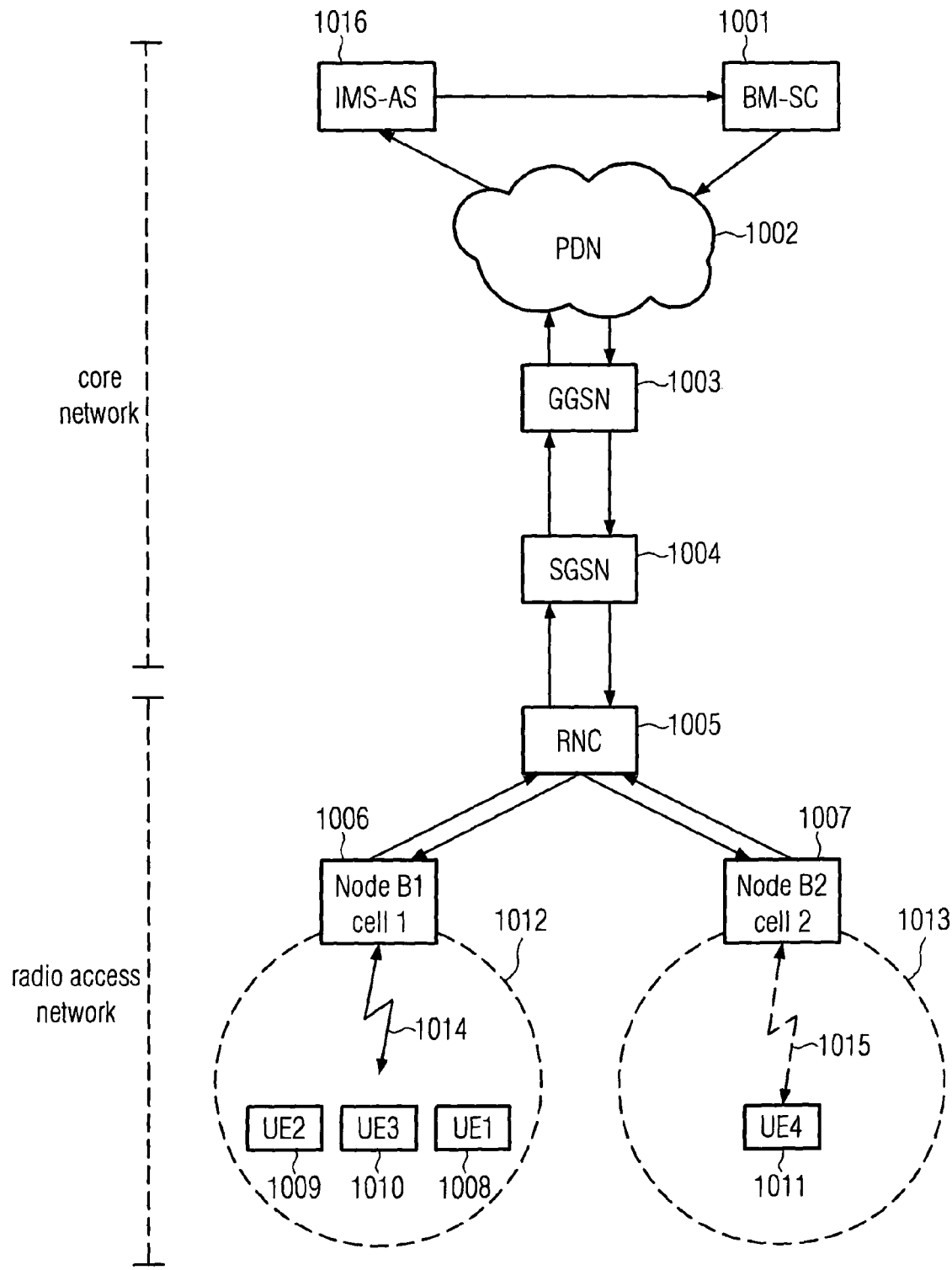
FIG. 10 shows an exemplary MBMS communication system.

FIG. 10 schematically illustrates an exemplary UMTS communication system, in which the embodiments of the invention may be implemented.

The bidirectional multicast service may be an IMS service and the downlink multicast service framework may be provided by an MBMS service. Accordingly, an IMS application server 1016 provides an IMS service to a plurality of user equipments 1008-1011 and hence serves as the source entity for the service data. The IMS service initiates the system resource configuration and establishes connections between the network elements GGSN 1003, SGSN 1004, RNC 1005 and the Node Bs 1006, 1007. Additionally, a dedicated connection (PTP) between the Node Bs to each of the plurality of UEs is established. For simplicity, these separate dedicated connections for the IMS service are not depicted in FIG. 10.

The IMS-AS 1016 may decide to use the MBMS service for the downlink service data provision. Consequently downlink data of the IMS service is sent to a Broadcast-Multicast Service Center (BM-SC) 1001, being the service provider of the MBMS service. However, it is also possible to implement the IMS-AS 1016 and the BM-SC 1001 in only one entity. Accordingly, no further interface would be necessary between these two entities.

The BM-SC 1001 is the data source for the MBMS data transmission. In this case the MBMS data is the downlink data of the IMS service. Hence the BM-SC 1001 may control the scheduling of the IMS downlink data. The service data may be transmitted through a Packet Data Network (PDN) 1002, such as the Internet to a gateway GPRS (General Packet Radio Service) support node (GGSN) 1003. The GGSN 1003 serves as an entry point for the IP data of the MBMS service. All incoming and outgoing connections go through the GGSN 1003. The GGSN 1003 forwards the service data to the specific serving GPRS support node (SGSN) 1004. The role of the SGSN 1004 within the MBMS architecture is to perform MBMS bearer service control functions for each individual user equipment 1008-1011 and to provide MBMS transmissions to the Radio Access Network (RAN). The network entity 102 of the core network illustrated in FIG. 1 may be the GGSN or the SGSN in the UMTS network. Consequently, in FIG. 1 the control entity 103 of the radio access network may be the RNC.

A typical UMTS network is divided into core network (CN), which is responsible for switching and routing calls and data connections and RAN that handles all radio-related functionality. The core network in this example is composed of the BM-SC 1001, the PDN 1002, the GGSN 1003 and the SGSN 1004. Data is forwarded from each entity of the core network to the next, thereby defining an uplink and downlink data path from the service provider 1001 to the access point of the RAN. This entry point to the RAN is the Radio Network Controller (RNC) 1005. System resources are to be configured for the forwarding of data, which may include at least the radio bearer establishment from the RNC to the UE and may further comprise tunnel configuration between the entities GGSN 1003, SGSN 1004 and the RNC 1005.

The RNC 1005 controls the different cells 1012 and 1013 in its domain, via the respective Node Bs 1006 and 1007. The RNC 1005 selectively transmits multimedia data to a particular cell via the respective Node Bs 1006, 1007. The user equipments 1008-1011 are located in different cells and are wirelessly provided with the downlink service data by the Node Bs 1006 and 1007 respectively. The Node Bs 1006, 1007, under control of the RNC, establish physical channels 1014, 1015 on the air interface in a certain cell to provide the MBMS service.

To provide a service to UEs in the RAN efficiently, typically a decision is made by the RNC, whether to use point-to-point (dedicated radio bearer) or point-to-multipoint (shared radio bearer) for the transmission of data. A PTP connection is a one-to-one connection between a UE and the RAN, whereas a PTM connection is one-to-many connection between RAN and a plurality of UEs. A radio bearer may be defined as a logical connection between a network entity in the RAN controlling radio resources and a UE. E.g. in typical mobile communication systems, this network entity in the RAN controlling radio resources is referred to as an RNC. In this case, a radio bearer may comprise the connection from the RNC to a Node B and an air interface connection from the Node B to UE.

The decision of which type of connection to use may be for example based on the number of UEs located in the cell, provided with the particular MBMS service. Typically, there need to be more than just a few UEs to receive the same content in order to make the use of a broadcast channel (a PTM connection) without power control efficient in comparison to dedicated channels. Thereby, an efficient use of the available radio resources can be ensured.

The invention relates to the case in which a PTP connection (dedicated radio bearer) is selected by the RNC for the provision of the downlink IMS data from the RNC to the UE utilizing the MBMS service. According to the exemplary embodiment shown in FIG. 10, the RNC establishes a PTP connection for the sole UE4 1011 located in cell 2 1013 for the MBMS service.

Although not illustrated in FIG. 10, for one MBMS service a plurality of SGSNs and a plurality of RNCs for each SGSN may be employed for service provision. Each of the SGSNs selectively transmits data to the RNCs, serving the UEs that receive the downlink service and each of the RNCs selectively transmits data to the UEs in the cells under its control. A list of nodes to which a data stream is to be transmitted may be stored in the network entities of the MBMS architecture. For instance, a list of RNCs is stored in the SGSN and a list of cells is stored in each RNC, to later selectively transmit data only to the nodes specified in the list.

A context, containing a set of information, may be established in the UEs and the network nodes, in order to establish a MBMS service provision by defining the system resources to allocate for the transmissions. E.g. in the MBMS service architecture a MBMS UE context and a MBMS bearer context is established. The MBMS UE context may contain UE specific information related to a particular MBMS bearer service that the UE has joined. The MBMS UE context may be created in the UE, SGSN, GGSN and BM-SC, when the UE joins an MBMS service. The following Table 1 illustrates an exemplary MBMS UE context.

TABLE 1

| MBMS UE context | |
|---|---|
| Parameter | Description |
| IP multicast address | IP multicast address identifying an MBMS bearer that the UE has joined. |
| Access Point Name (APN) | Access Point Name on which this IP multicast address is defined. |
| GGSN Address in use | The IP address of the GGSN currently used. |
| SGSN Address | The IP address of the SGSN. |
| TMGI | Temporary Mobile Group Identity allocated to the MBMS bearer. |
| Linked NSAPI | Network Service Access Point Name of the PDP context used by the UE to carry IGMP/MLD signalling. |
| IMSI | International Mobile Station Identity identifying the user. |
| TI | Transaction Identifier |
| MBMS_NSAPI | Network Layer Service Access Point Identifier which identifies an MBMS UE context. |

The parameters define a routing path from the service provider, BM-SC 1201 to the user equipment of the context. The specified APN may be used for identifying the MBMS service provided to the UE. The APN is for example a logical name used by the GGSN to determine a service requested by the user or the address of an access point in an external packet network to which user packets should be forwarded.

As mentioned above, contexts are necessary to access a network or provide and receive a particular service. Different contexts are established for the two services IMS and MBMS separately.

For the IMS service, typically a PDP context is created for the IMS control signaling and the IMS data. Alternatively, two PDP contexts may be established: a primary PDP context may be used for the IMS control signaling and a secondary context may be activated for the IMS data.

The IMS PDP contexts maintained by a network node may contain a set of information the network uses to determine how to forward user packets destined to and originated from a particular service provider. For example, the context may include a PDP address, which is used by the mobile to send and receive PDP packets. Furthermore, routing information may be comprised in the PDP contexts, including tunnel endpoint identifiers of the tunnels (TEID) and an Access Point Name (APN), which identifies the IMS service. In addition, Quality of Service Profiles may be defined therein, which are however not relevant for the function of the invention.

Two separate data paths are depicted in FIG. 10, one for uplink and one for downlink. In the following, only UE4 1011 with the PTP connection in the RAN will be used for illustration. A MBMS service provider, BM-SC 1001, receives the downlink service data from the IMS application server (IMS-AS) 1016. The downlink service data is routed through a PDN 1002, like the Internet, to the GGSN 1003 and forwarded by every network entity of the CN and the RAN to the UE4 1011. The uplink path from the UE4 1011 goes directly to the IMS-AS 1016, without the detour over the BM-SC 1001 of the MBMS service. The network entities on the uplink path are in the sequence of UE4 1011, RNC 1005, SGSN 1004, GGSN 1003, PDN 1002 and the IMS-AS 1016.

Figure 11:
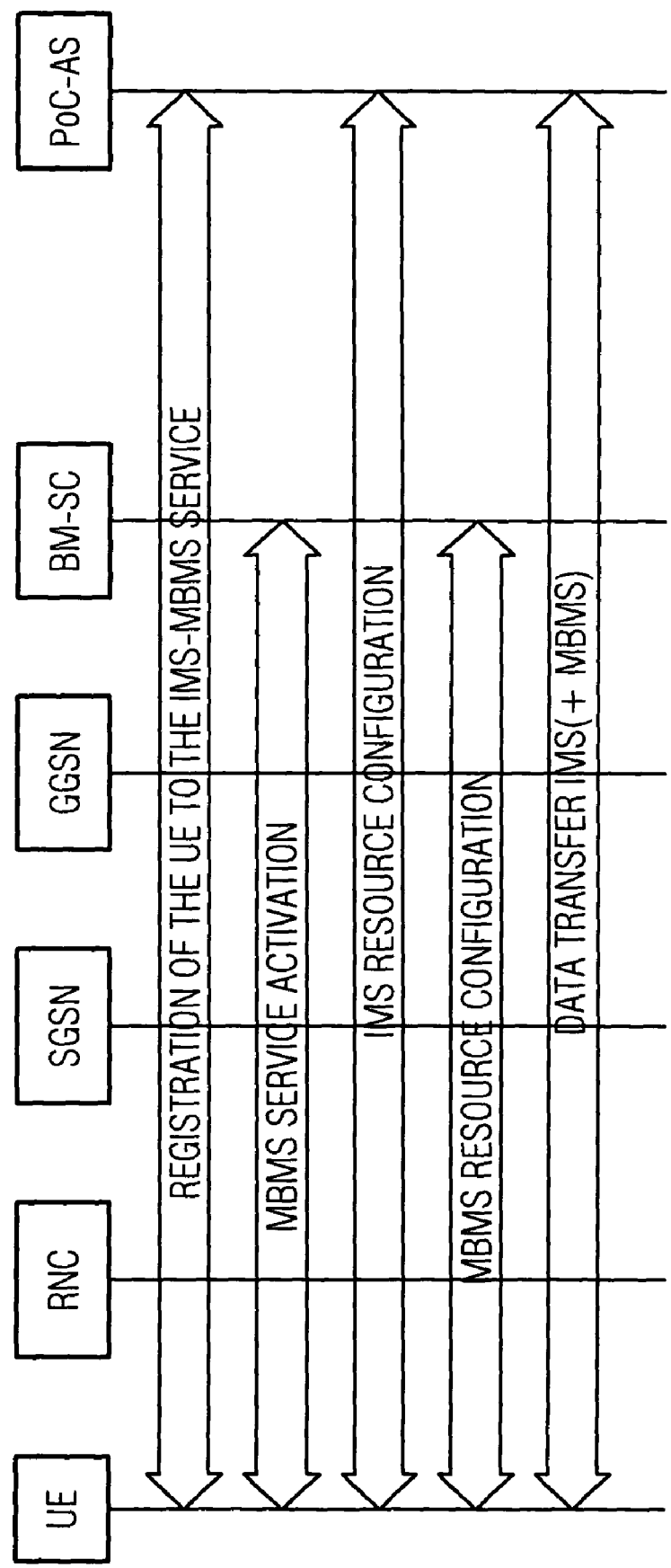
FIG. 11 illustrates a logical sequence chart for an IMS-MBMS service.

The sequence chart of FIG. 11 schematically illustrates a logical sequence of an IMS service provision, which uses the MBMS multicast capabilities for providing the downlink service data to the UE.

First, the UE4 1011 may register to the IMS-MBMS service. The term IMS-MBMS service denotes an IMS service which uses a MBMS service for the downlink provision. In order to use a MBMS service to provide the downlink data, the MBMS service must be activated and necessary contexts are established.

System resources may be configured according to the activated IMS PDP contexts. This may for example include the establishment of a tunnel between the GGSN 1003 and the SGSN 1004 and a tunnel between the SGSN 1004 and the RNC 1005. Additionally, a radio bearer may be established between the RNC 206 and the UE4 1011. The radio bearer may be identified by a Radio Bearer ID. The Radio Bearer ID may for example be stored in the SGSN 1004, the RNC 1005 and the UE4 1011.

Afterwards, the system resources of the UMTS network for the MBMS service are also configured according to the established contexts. In a conventional MBMS setup procedure, this comprises the set-up of tunnels between the GGSN 1003, SGSN 1004 and the RNC 1005 and comprises the establishment of a radio bearer between the RNC 1005 and the UE4 1011. The latter can be a dedicated radio bearer or a shared radio bearer Use of a dedicated radio bearer or a shared radio bearer may for example depend on the number of users receiving the same IMS-MBMS service in the specific radio cell. Regarding cell 2 1013 a dedicated radio bearer would be decided for UE4 1011. After resource configuration, service data can be transferred to and from the UE4 1011 via the established uplink and downlink paths.

In a conventional system, in case the RNC decides to use a PTP link (dedicated radio bearer) for the MBMS service providing the IMS downlink data, there are two dedicated radio bearers established in the RAN, however each is used only in one direction. During the first part of the described procedure, the IMS service setup, a radio bearer is build-up for the uplink connection and the control signalling to the service provider, through which for example, for a PoC-service, the user voice of the UE is transmitted. In the MBMS service setup, a radio bearer is established exclusively for the downlink transmission of service data, through which for example user voice of other UEs is provided to the user. Resource reservation from the RNC to the Node B is conducted, as well as the reservation of air link resources from the Node B to the user equipment like orthogonalization codes, spreading etc.

According to an embodiment of the invention the MBMS setup procedure re-uses the already established radio bearer of the IMS service for the provision of the downlink IMS data.

Figure 2:
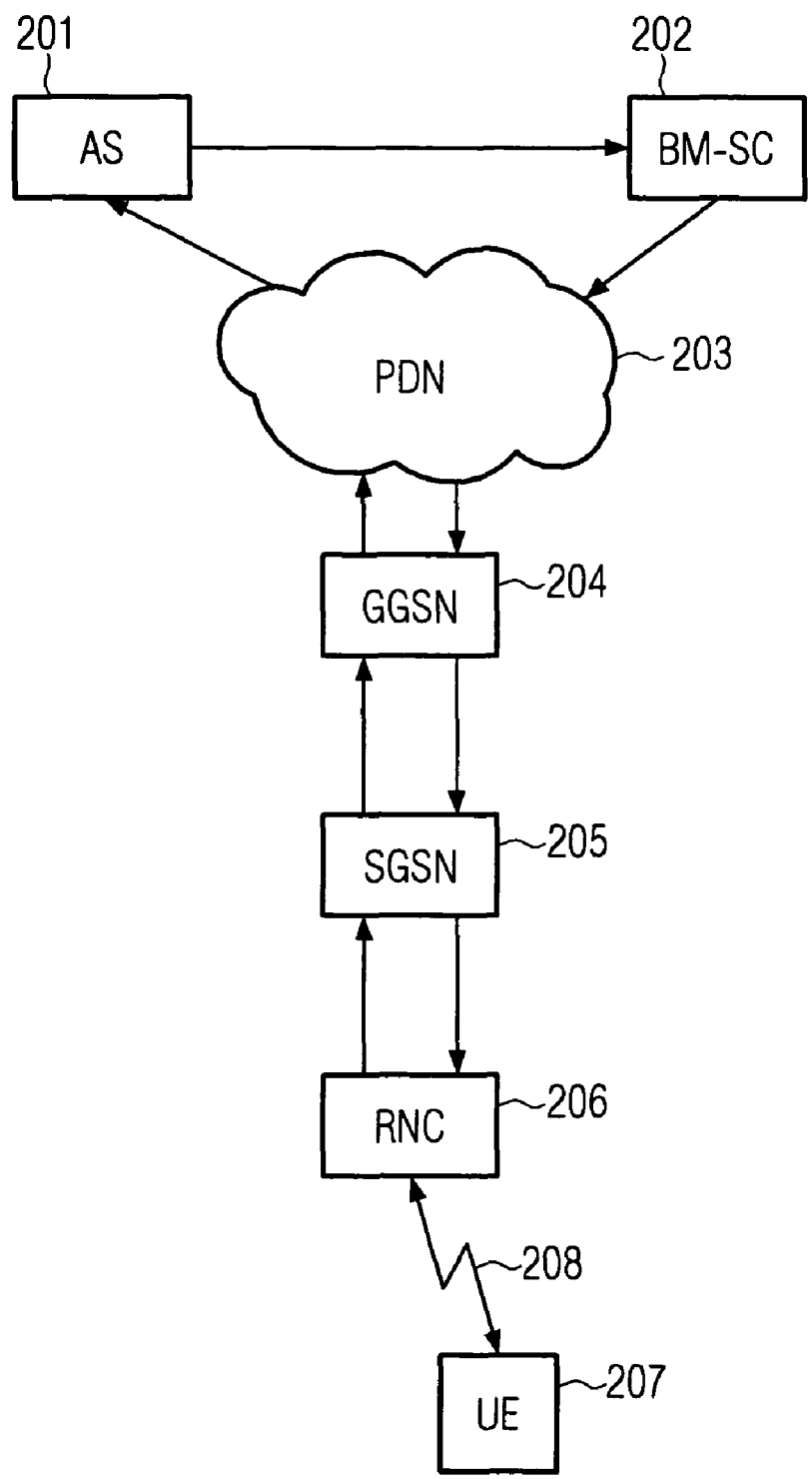
FIG. 2 shows an UMTS communication system according to one embodiment of the invention.

In the following, the previous embodiment of the invention will be explained in more detail according to FIG. 2.

An application server 201 is the service provider of an IMS service provided to an user equipment 207. The IMS service which may be an exemplary UMTS implementation of the bidirectional multicast service. The IMS service uses a MBMS service for the downlink provision of IMS service data, which may correspond to a downlink multicast service framework. Accordingly, a BM-SC receives service data to be provided to user equipments from the application server 201. A packet data network 203, which can be the Internet, may be located between the service providers AS 201, BM-SC 202 and the remaining provision network elements. However, for the invention it is of no importance whether a packet data network is in between, or the service providers are located in the same network.

The GGSN 204 serves as a gateway from the PDN 203 to the SGSN 205. Additionally, the GGSN 204 can also be the access point for circuit switched networks like the ISDN network. The SGSN 205 is further connected to the RNC 206 of the radio access network and the RNC 206 is further linked to the user equipment 207. The Node B interconnected between the RNC 206 and the UE 207 is omitted, however it should be noted that the Node B is present and that the RNC 206 communicates with the UE 207 via the Node B.

The IMS application server 201 may then decide to use the MBMS service for the transmission of the downlink data. The invention is only directed to the cases where the MBMS service is utilized for the provision of downlink data of the IMS service.

A new MBMS service is established at the BM-SC 202, for example by the IMS application server 201 which registers a group of users to receive the MBMS service for the IMS downlink data. Subsequently, the IMS application server 201 sends corresponding MBMS user service descriptions to the group of users, registered to the IMS-MBMS service.

Thereupon, the MBMS service activation process is started. First, the UE 207 sends a Join message to the GGSN 204, which then transmits a authorization request to the BM-SC 202. After successful authorization, the MBMS contexts are enabled. This includes the activation of a MBMS UE context in the network nodes. Similar to the PDP contexts of the IMS service, the MBMS UE context contains information necessary for the routing of service data. The specific parameters are noted in Table 1 of this description. As apparent from Table 1, the MBMS UE context also includes the APN of the IMS service, which in case of a combined IMS-MBMS service, is identical to the APN in the PDP context, established for the IMS service. The UE 207 must stay in RRC (Radio Resource Control) connected mode so its MBMS UE context is not deleted by the RNC.

Figure 3:
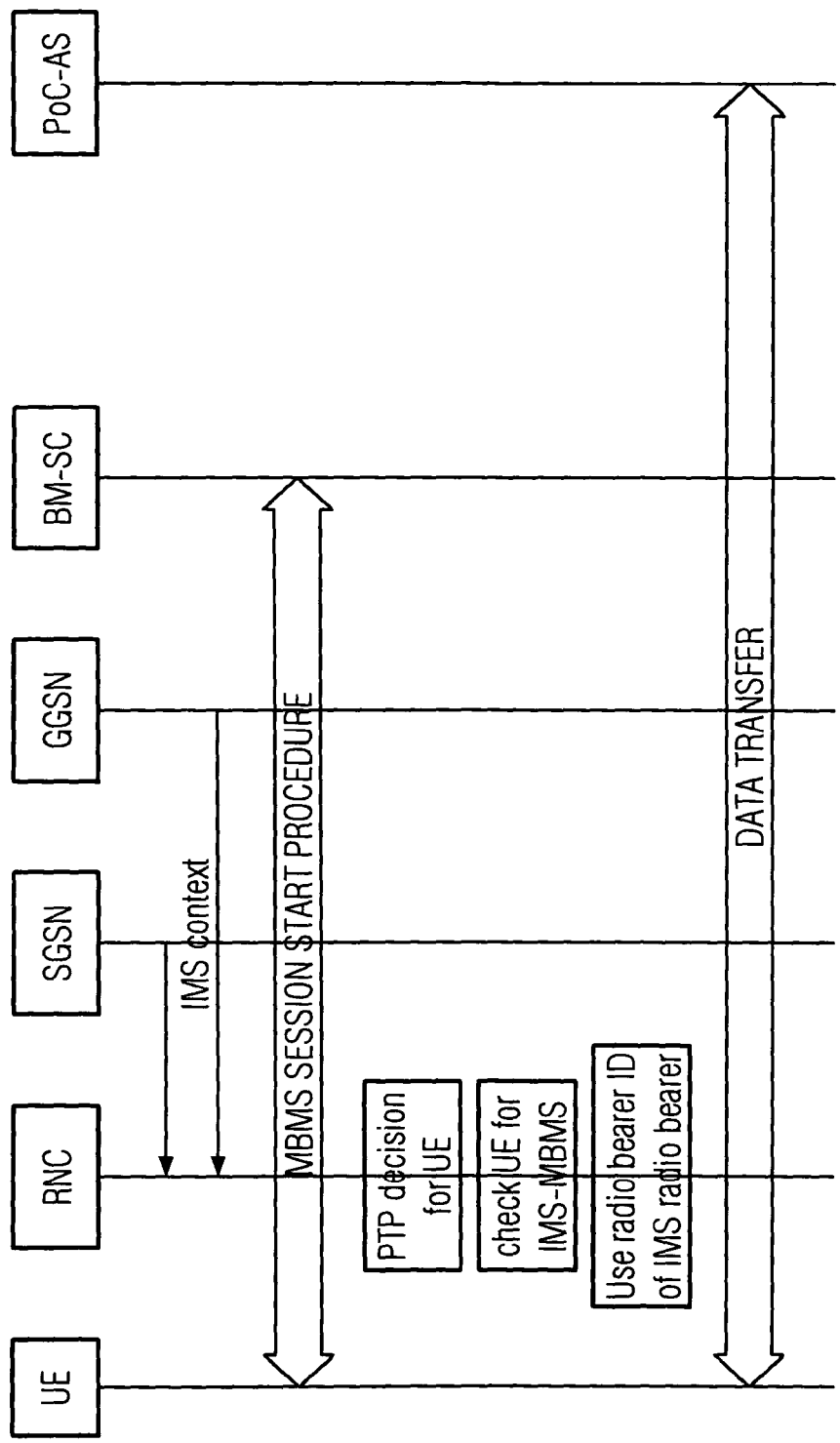
FIG. 3 shows a sequence chart for the configuration of system resources during a MBMS service setup according to one embodiment of the invention.

The subsequent steps are illustrated in FIG. 3. The chart shows a logical sequence conducted according to an embodiment of the invention. As the PDP context of the IMS service is not present at the RNC 206, it is necessary to provide the RNC 206 with the necessary information. In the typical UMTS network, the PDP context information is present at the SGSN 205 and the GGSN 204, so any of these two entities can transmit the information to the RNC.

More specifically, the GGSN or the SGSN hold an IMSI (International Mobile Station Identity) parameter of the UE 207 in the PDP context of the IMS service. Furthermore, by comparing the APN of the MBMS UE context and the APN of the PDP context, it is possible to identify if the service provided to the specific UE is an IMS-MBMS service. In case the provided service is an IMS-MBMS service, the GGSN or SGSN transmits the PDP context of the IMS service for the UE 207 to the RNC 206, also comprising the APN of the IMS service the UE 207 is registered to.

Thereupon, the RNC 206 creates a table with the received PDP context information, including the APN.

Subsequently, the MBMS session start procedure is initiated by the BM-SC and forwarded via the network elements to the RNC. The procedure is a request to activate all necessary bearer resources in the network for the transfer of MBMS data and to notify registered UEs of the imminent start of the transmission.

The MBMS session start procedure is conducted as far as the RNC 206. Before the typical RAN resource setup, if the RNC 206 decides to use a PTP link for the particular UE 207, the RNC checks the information of the PDP context, received from the GGSN or SGSN and compares the included APN with the APN of the MBMS UE context. If the APNs are identical, the particular UE 207 is registered to an IMS-MBMS service.

The RNC 206 further holds the radio bearer ID of the radio bearer established for the IMS service provided to the particular UE 207 and associates the radio bearer ID, used for the specific UE 207, to the downlink MBMS service data. Thereby, the MBMS service re-uses the already established radio resources 208 in the RAN for its transmission. Subsequently, the RAN resource setup of the MBMS session start procedure is aborted. Now after complete system resources setup the data transfer may be initiated.

The configured dedicated radio bearer 208 of the IMS service is utilized by the MBMS service for its provision of service data. Thus, the radio bearer is used for the uplink connection and control signaling from the UE 207 to the IMS application server 201, as well as for the downlink connection from the BM-SC 202 to the UE 207. According to the embodiment of the invention, no radio resources are wasted for an additional dedicated radio bearer in the MBMS service setup.

Figure 4:
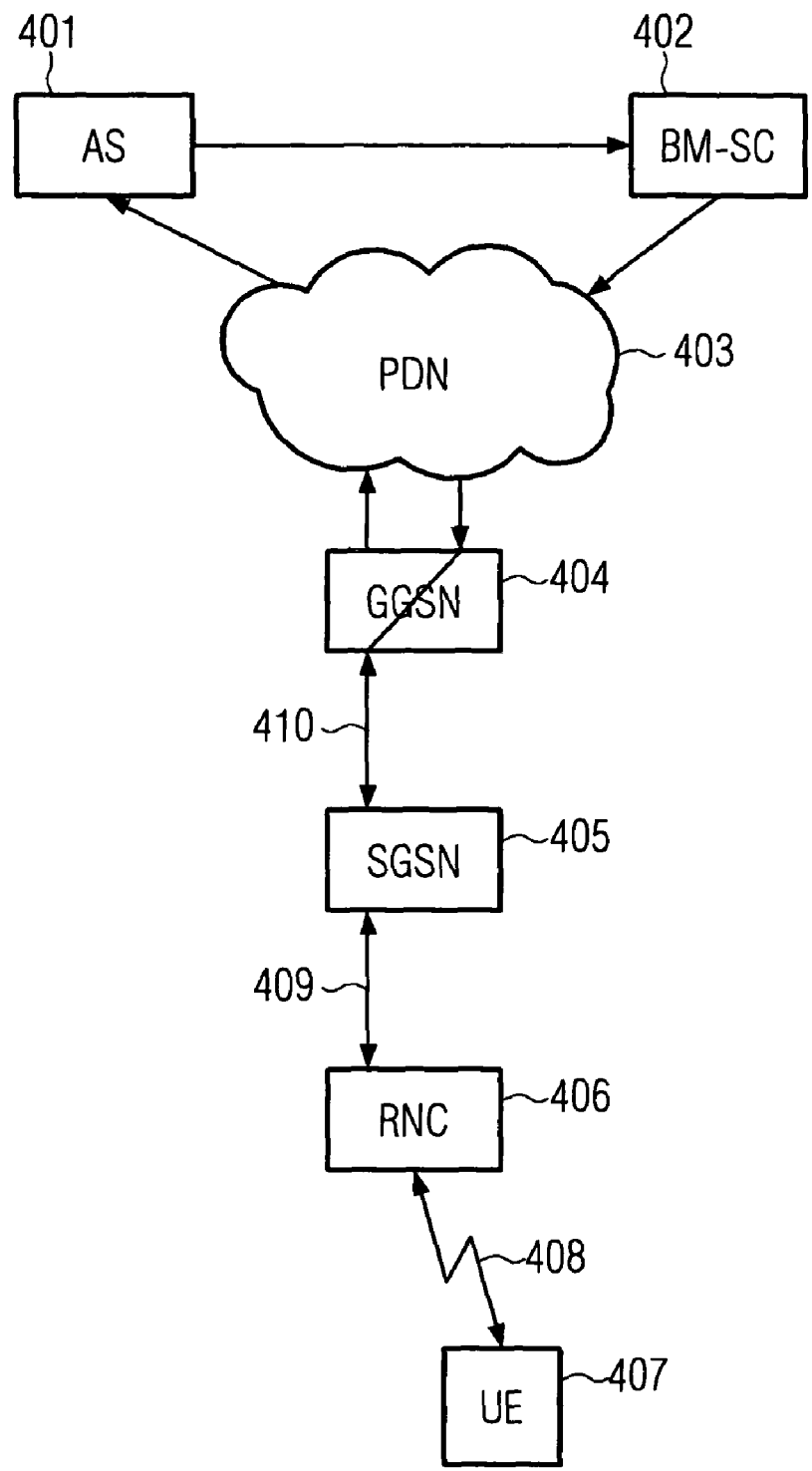
FIG. 4 shows an UMTS network according to another embodiment of the invention.

In FIG. 4 an UMTS network according to another embodiment of the invention is depicted. Similar to the previous embodiment illustrated in FIG. 2, an IMS service is provided from an IMS application server 401 to an UE 407. Accordingly, the UMTS network comprises the elements of a PDN 403, a GGSN 404, a SGSN 405, a RNC 406 and a BM-SC 402 for the MBMS service, which are used for the downlink provision of service data. The system resources for the IMS service are configured and reserved, including the establishment of an IMS tunnel 410 from GGSN 404 to SGSN 405 and an IMS tunnel 409 from SGSN 405 to RNC 406. Furthermore, a radio bearer 408 is established for the IMS service between the RNC 406 and the UE 407.

Figure 5:
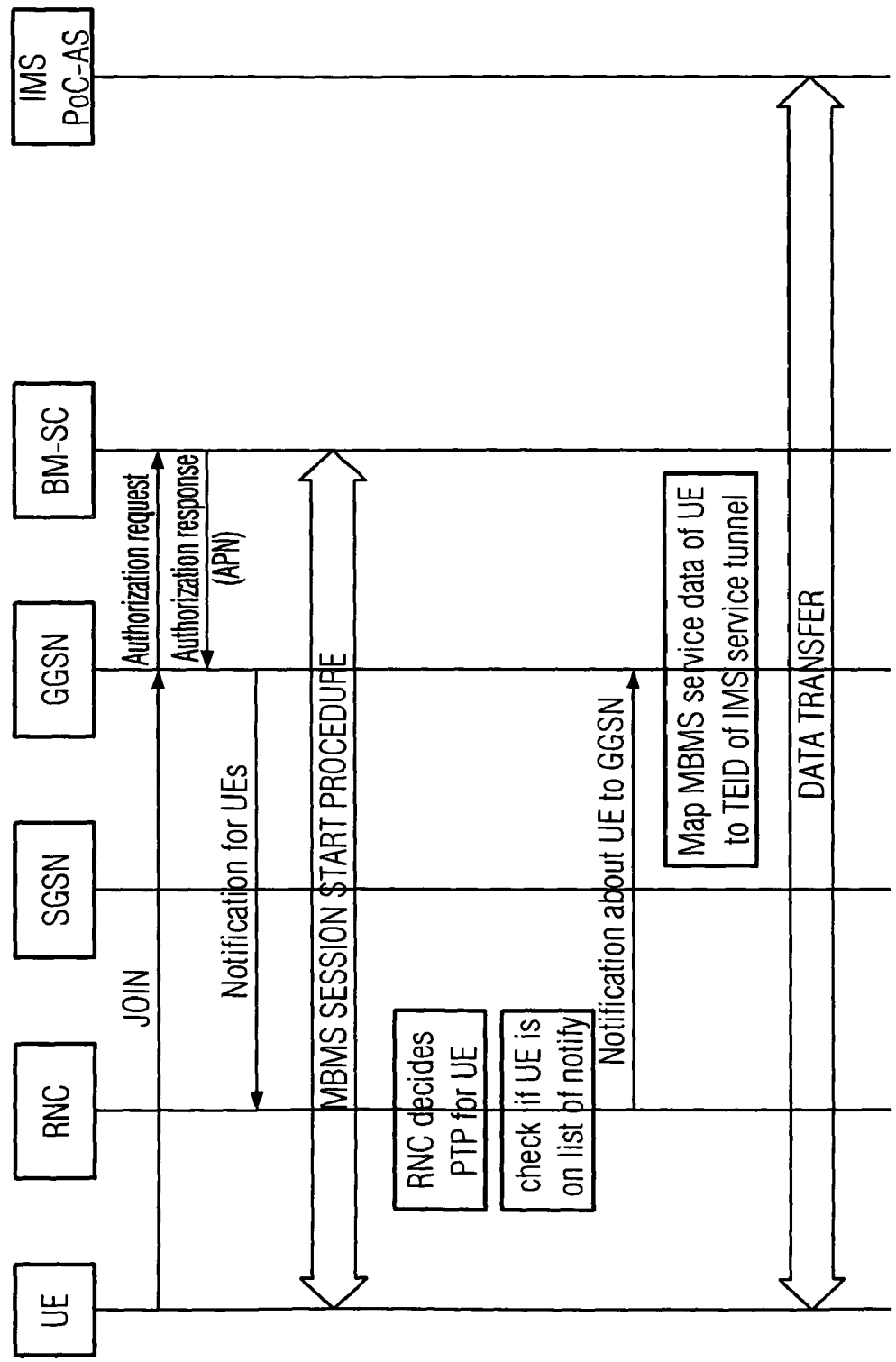
FIG. 5 shows a sequence chart for the configuration of system resources during a MBMS service setup according to another embodiment of the invention.

In FIG. 5 a sequence chart is shown which aims to illustrate the MBMS service configuration according to an embodiment of the invention in the following. During the MBMS service activation process the UE 407 transmits a Join message to the GGSN 204. The Join message may be transmitted to the GGSN 204 via the already established IMS data bearer, defined by the secondary PDP context or via the IMS control signalling bearer, defined by the primary PDP context. The GGSN 204 then requests authorization of the BM-SC 202, which if successful provokes a MBMS authorization response message including the APN of the MBMS service. After successful authorization, the MBMS contexts are enabled as explained above.

The GGSN 404 holds an IMSI (International Mobile Station Identity) parameter of the UE 407 in the PDP context of the IMS service. Furthermore, by comparing the APN of the MBMS UE context and the APN of the PDP context, it is possible to identify if the service provided to the specific UE 407 is an IMS-MBMS service. In case the provided service is an IMS-MBMS service, the GGSN 404 notes this particular UE 407 in a table, including the corresponding APN parameter of the IMS service. The GGSN 404 notifies the RNC 406 about this particular UE 407 either directly or via the SGSN 405.

The MBMS session start procedure is then initiated and proceeded as far as the RNC 406. Before the typical RAN resource setup, if the RNC 406 decides to use a PTP link for a particular UE, the RNC 406 checks if the particular UE is the UE 407 specified by the notification received from the GGSN 404. If the UE is the specified UE 407, registered to receive the IMS-MBMS service, the RNC 406 will notify the GGSN 404 about this specific UE 407. After this notification from the RNC 406 to the GGSN 404, the RNC will not start resource reservation during the RAN resource setup procedure.

The GGSN 404 receives the notification from the RNC 406 with the information about the UE 407. Subsequently, the GGSN 404 assigns the TEID of the PDP data transmission context to the downlink MBMS service data. Accordingly, thereby the GGSN 404 routes the MBMS service data to the already configured IMS data tunnel 410. No additional tunnel is necessary between the GGSN 404 and SGSN 405, and from the SGSN 405 to the RNC 406, hence no system resources like bandwidth, etc are wasted therefore.

The configuration of tunnels in the core network may include explicit resource reservation depending on the implementation and the appliance of the tunnel. In a standard UMTS implementation for voice calling it may not be necessary to reserve resources like bandwidth etc. However, for appliances like video conferencing or video streaming, which need more resources it may be advisable to conduct a explicit resource reservation according to the set Quality of Service (QoS) parameters of the specific tunnel.

Depending on which IMS radio bearer was used to send the Join message from the UE to the GGSN 404, as noted above, the GGSN 404 must look for the corresponding resource identifier. If the IMS control signalling bearer was used, the GGSN 404 must look for the secondary PDP context, defining the IMS data bearer. In case the IMS data bearer was used, the resources are identified by the MBMS UE context and the data may be forwarded to the SGSN 405.

In consequence, the SGSN 405 receives the MBMS service data through the IMS data tunnel 410 and forwards it through the IMS data tunnel 409 to the RNC 406, thereby reusing the already established network resources. Accordingly, system resources may be saved as no additional tunnel is established. The RNC 406 hence receives the MBMS service data via the IMS tunnel 409 and consequently forwards it through the already established radio bearer 408 to the UE 407.

No additional radio bearer and tunnels are configured and no additional system and radio resources are reserved and wasted therefore. According to the embodiment of the invention, this is achieved by re-mapping in the GGSN 404 the downlink MBMS service data to the IMS tunnel and thereby reusing the tunnels 410, 409 and the radio bearer 408.

Figure 6:
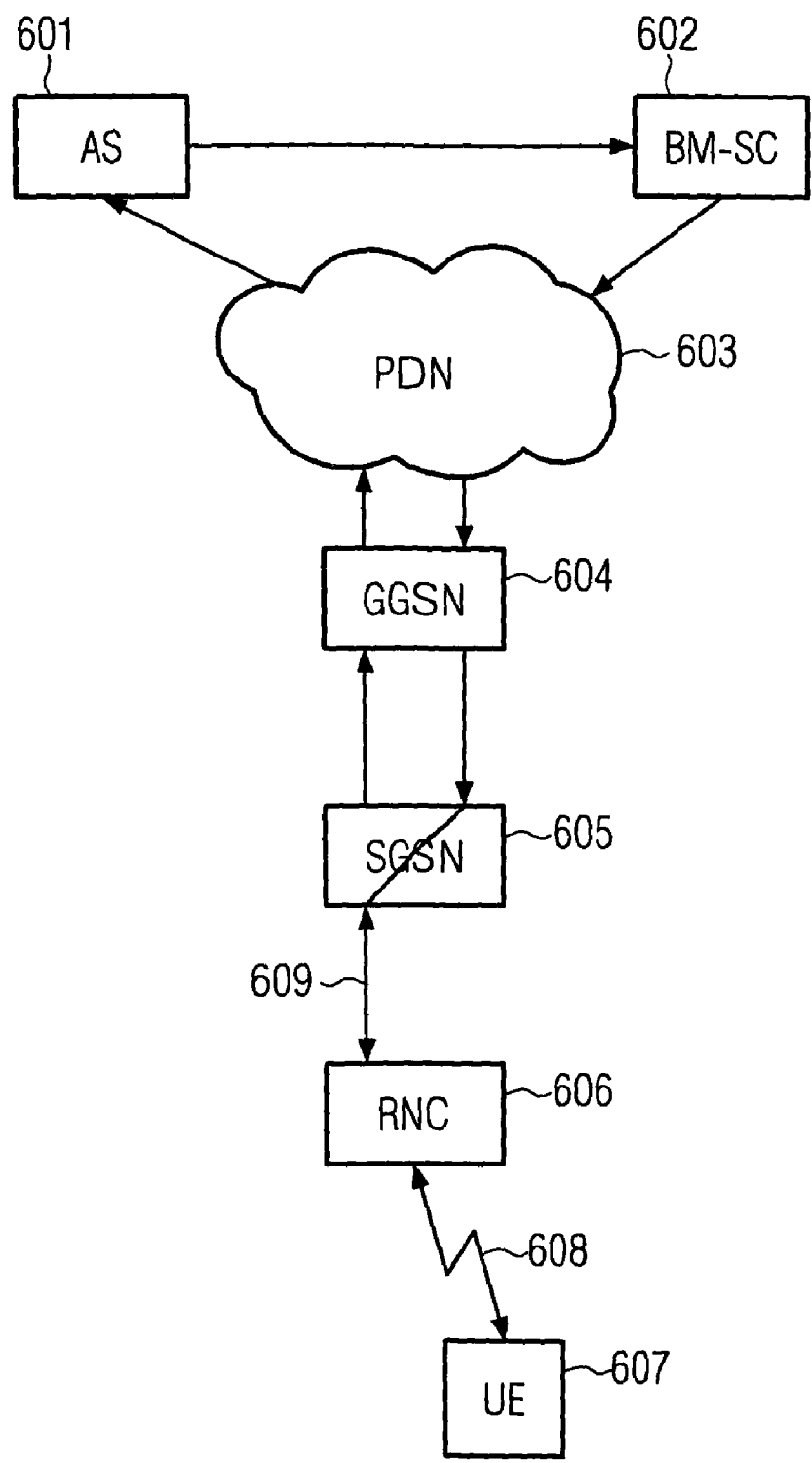
FIG. 6 shows an UMTS network according to another embodiment of the invention.

In FIG. 6 an UMTS network is depicted according to another embodiment of the invention. The UMTS system is similar to the system of the previous embodiments illustrated in FIGS. 2 and 4. An IMS service is provided using a MBMS service for transmitting downlink IMS service data. The UMTS network is composed of the following network elements: IMS application server 601, BM-SC 602, PDN 603, GGSN 604, SGSN 605, RNC 606 and UE 607.

In compliance with the above description, necessary PDP contexts and MBMS contexts are set-up. The configuration of system resources for the IMS service is already conducted, which comprises the establishment of a tunnel between the GGSN 604 and the SGSN 605 and a tunnel 609 between the SGSN 605 and the RNC 606. In addition, a radio bearer 608 from the RNC to the UE is set-up.

The MBMS service setup is very similar to the one of the previous embodiment exemplified in FIG. 5. However, in this case the SGSN 605 notifies the RNC of the UEs, registered to the IMS-MBMS service. Accordingly, after the decision of the RNC 606 to use a PTP connection for this specific UE 607, the subsequent notification of the UE 407 with the imminent PTP connection is sent to the SGSN 605 and the RAN resource setup of the MBMS session start procedure is aborted. Consequently, the SGSN 605 receives the notification including the information on the UE 607 and assigns the TEID of the PDP data transmission context to the downlink MBMS service data. The downlink data of the MBMS service is thereby transmitted through the IMS tunnel 609 to the RNC 606, instead of through a secondary tunnel. Consequently, no system resources may be reserved and hence wasted for a secondary tunnel. A re-tunnelling is conducted, which enables the RNC 606 to receive the MBMS service data from the IMS tunnel and hence to forward it to the UE 607 via the already present radio bearer 608.

Figure 7:
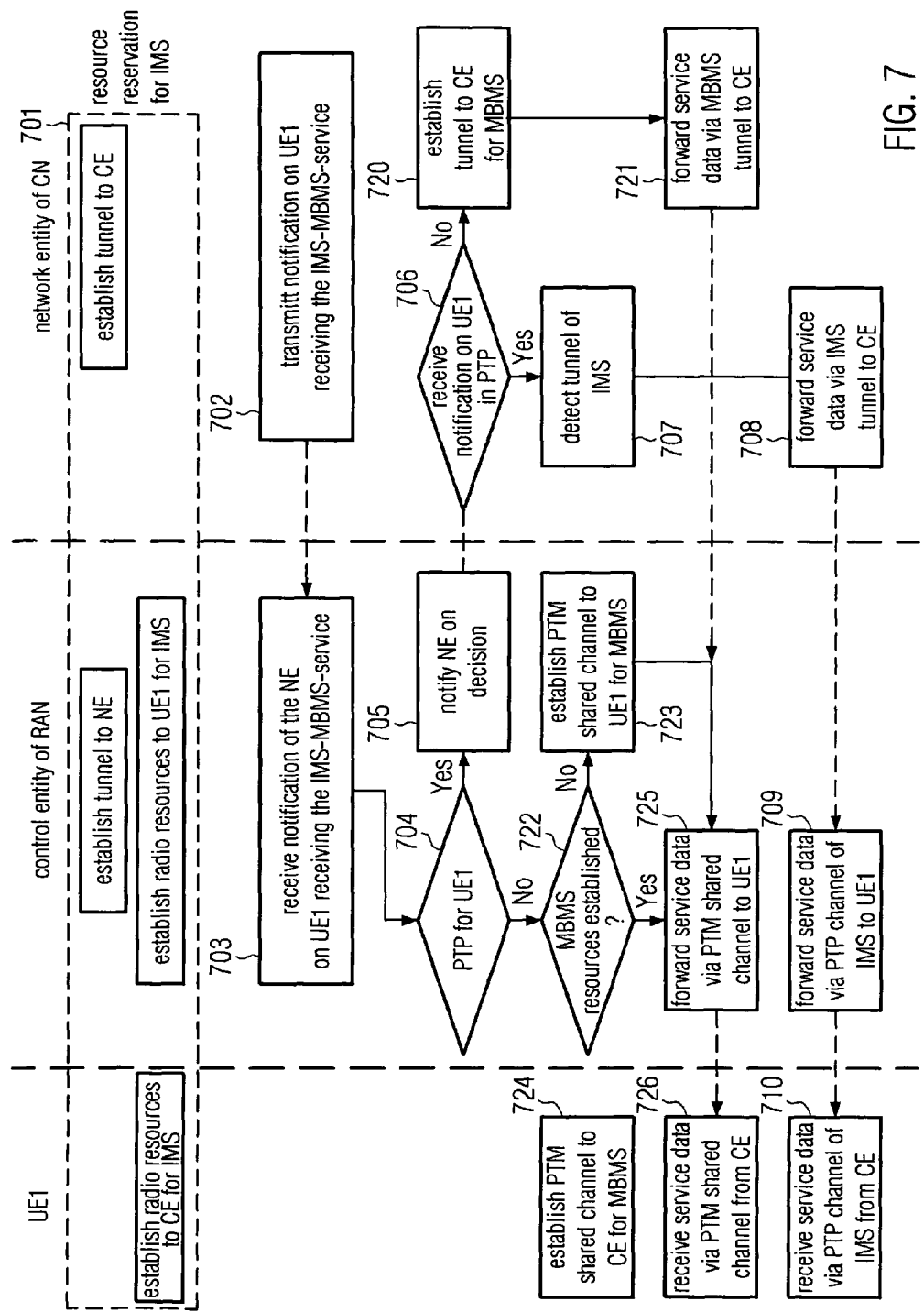
FIG. 7 shows a flow chart of an IMS-MBMS service setup.

In FIG. 7 a flow chart for the set-up of an IMS service that uses a MBMS service for transmitting the downlink IMS service data is depicted. This is a schematic flow chart that only explains logically the setup procedure. The network system therein is comparable to that of FIG. 1, and is composed of a network entity (NE) in the core network, a control entity (CE) in the radio access network and a user equipment UE1. The shown embodiment in FIG. 7 is comparable to the embodiment described in FIGS. 4-6, wherein the network entity of the core network in one case is the SGSN and in the other the GGSN.

The flow chart starts with resource configuration 701 for the IMS service. This includes the establishment of a tunnel between NE and CE and radio resources, more specifically a radio bearer, between CE and UE1.

The network entity holds the necessary information for identifying the UEs which are registered to the bidirectional service (IMS) using the downlink multicast service architecture (MBMS). NE notifies 702 the CE on this UE1. The CE receives this information and starts with the MBMS session start procedure, wherein the CE decides 704 whether to use a PTP connection for UE1. In case a PTP connection is decided, the CE notifies the NE on this decision.

After the previous transmission 702 of the notification on the UE1 to the CE, the NE waits if a notification of the CE is received 706, regarding the decision to use PTP for UE1. The NE receives the notification 706 and proceeds with detecting 707 the already established IMS resources 701. The established IMS tunnel is identified from its TEID, and this TEID is assigned to the MBMS service data 708, which is consequently forwarded via the IMS tunnel to the CE. The CE receives the service data from the NE through the IMS tunnel and accordingly forwards 709 it to the UE1 via the PTP link, established 701 for the IMS service. The UE1 receives 710 the service data through the dedicated radio bearer (PTP channel) of the IMS service.

In case the CE entity decides 704 not to use a PTP connection for UE1, no notification is sent to the NE and accordingly no notification is received 706 in the CE. Subsequently, an additional tunnel is established 720 from the NE to the CE. In addition, in the NE it is reviewed if MBMS resources are established 722. If no resources are configured or reserved, this entails the establishment 723 of a PTM shared channel to the UE1. The UE1 accordingly accepts 724 the PTM shared channel from the CE to UE1 for the MBMS service. If a PTM connection is decided a shared radio bearer might be already available, because of the a previous set-up for other users in the radio cell.

In the NE the IMS-MBMS service data is forwarded 721 via the established MBMS tunnel to the CE, wherein the service data is received and forwarded 725 via the established shared radio bearer to the UE1. Finally, the UE1 receives 726 the MBMS service data through the PTM channel.

Figure 8:
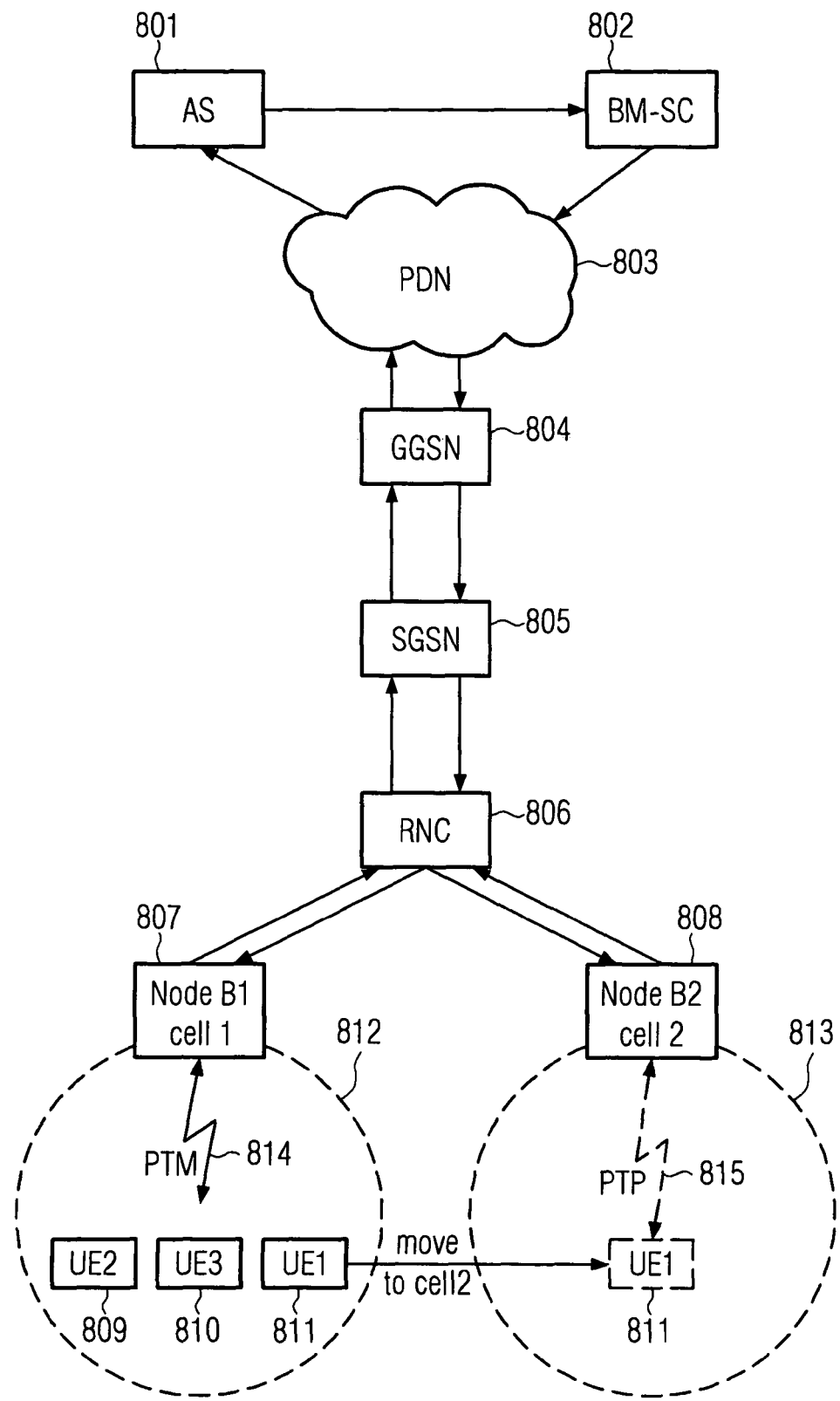
FIG. 8 shows an UMTS network according to another embodiment of the invention, wherein a hand-over procedure is illustrated.

In FIG. 8 an UMTS network is illustrated, including an IMS application server 801, which acts as a service provider. The IMS service is provided to a plurality of UEs, UE1 811, UE2 809 and UE3 810. The network nodes GGSN 804, SGSN 805 and RNC 806 forward service data destined to and transmitted from the UEs. Two base stations Node B1 807 and Node B2 808 are connected to the RNC 806, supplying two different radio cells 812, 813. By means of this figure a hand over procedure between two cells shall be explained.

Presumably, at the beginning the three UEs 809-811 are located in cell 1 812. The service data is provided via a PTM link 814 from the Node B1 to all UEs registered to the service in this radio cell, which in this case amounts to the UEs 809-811. The dedicated bearers for the uplink transmission of the IMS service from every UEs to the Node B1 are omitted, but nevertheless already established.

In case the UE1 811 moves from cell 1 812 to cell 2 813, the RNC checks for the quantity of UEs receiving the service in cell 2. Presumably, there are no other UEs in cell 2, hence the RNC decides for a PTP connection for UE1 811. The IMS dedicated radio bearer is established and according to the previous embodiments of the invention, this already established radio bearer is re-utilized by the MBMS service to transmit the downlink MBMS data to the UE1.

The contrary case, wherein a UEs changes during a hand-over procedure from a PTP connection to a PTM connection is not illustrated in FIG. 8. However, a short explanation therefore will be given in the following.

Presumably, the UE1 is located in radio cell 2 813, the source cell, and moves to radio cell 1 812, the target cell. In cell 2 a PTP connection to the UE for the MBMS service was decided, regarding the low number of UEs registered to the service in this cell. During a hand-over to a target cell, wherein a plurality of UEs already receive the service via a PTM connection, the RNC knows that other UEs receive the same service in the target cell via a shared radio bearer. The UE will conduct a hand-over procedure to the target cell and acquires the necessary radio bearer information of the PTM connection. The UE then listens to the MBMS service over the PTM connection in the target cell. Besides, the RNC tears down the previous PTP radio bearer service of the UE in the source cell. Additionally, notification messages to the GGSN or SGSN, depending on the employed specific embodiment of the invention, must be transmitted in order to disable the re-mapping operations, that route the MBMS service data through the IMS tunnel. This avoids the reception of the same data through the IMS dedicated radio bearer and the MBMS PTM radio bearer.

Figure 9:
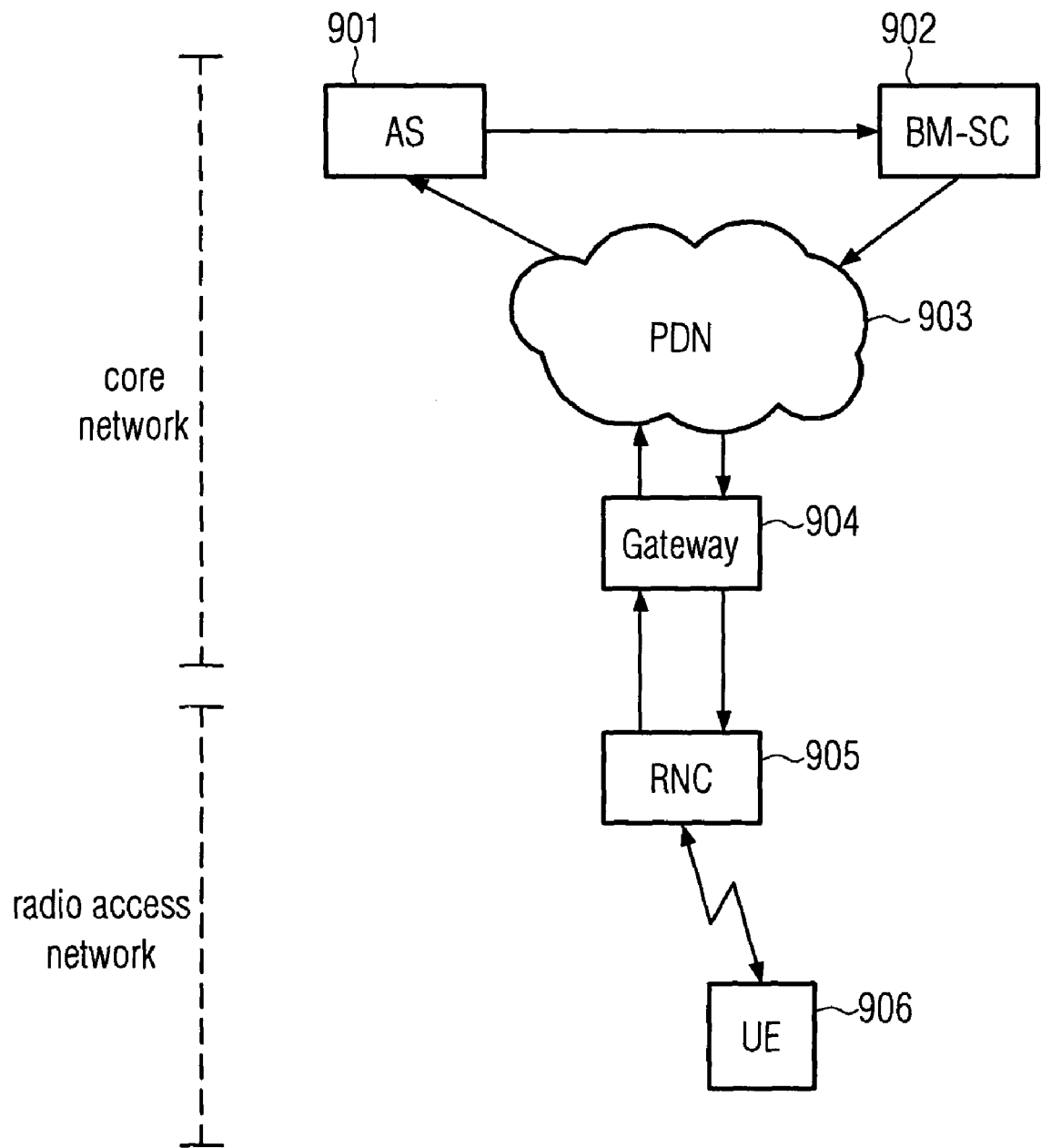
FIG. 9 shows an UMTS network with a different architecture in the core network.

It should be further noted that the invention can be used in systems as described in the above embodiments and the corresponding UMTS networks illustrated in the FIGS. 2, 4, 6 and 8 but is not limited to the use in these systems. Rather, FIG. 9 shows an UMTS network architecture with other core network entities. Instead of using a SGSN and a GGSN as core network elements, a gateway 904 is implemented as sole access point to a PDN 903 and to a RNC 905. The gateway 904 is used as network entity in the embodiments of the invention.

Moreover, a network entity, which in a typical UMTS implementation might be the GGSN or the SGSN forwards the bidirectional multicast service data to a plurality of users. The users may receive the service data using a downlink multicast service framework via a PTM and a PTP connection from the control entity of the RAN, the RNC. The system resources are configured for the plurality of the users to receive the service data via the configured PTM connection. At least one user receives the service data via a configured PTP connection.

In this case, it is necessary to duplicate the data packets in order to transmit the service data on the one hand to the one user using the PTP radio bearer and on the other hand to the multiple users using the PTM radio bearer. This may be conducted in a network entity of the core network or in a control entity of the radio access network, Another possibility for identifying the user terminal using the combined IMS-MBMS service is to introduce a unique multicast identifier exclusively for these specific IMS-MBMS service. This could be for example an unique Access Point Name (APN), "ims-mbms.server.com". This approach makes it unnecessary to compare the two multicast identifiers in the contexts activated for the IMS and the MBMS service setup. Furthermore, regarding the embodiment of FIGS. 2 and 3, by using a unique APN it is no longer necessary at the beginning to transmit an IMS PDP context from the GGSN or the SGSN to the RNC, so as to provide the RNC with the information (APN) for linking the two services together. It suffices to check the MBMS UE context stored in the RNC and look for the APN to unambiguously identify the UE with the IMS-MBMS service.

Another embodiment of the invention relates to the implementation of the above described various embodiments using hardware and software. It is recognized that the various embodiments of the invention above may be implemented or performed using computing devices (processors), as for example general purpose processors, digital signal processors (DSP), application specific integrated circuits (ASIC), field programmable gate arrays (FPGA) or other programmable logic devices, etc. The various embodiments of the invention may also be performed or embodied by a combination of these devices.

Further, the various embodiments of the present invention may also be implemented by means of software modules which are executed by a processor or directly in hardware. Also a combination of software modules and a hardware implementation may be possible. The software modules or instructions may be stored on any kind of computer readable storage media, for example RAM, EPROM, EEPROM, flash memory, registers, hard disks, CD-ROM, DVD, etc.

The invention claimed is:

1. A method for setting up a first multicast service comprising a bidirectional multicast service from a multicast service provider to a mobile terminal within a mobile communication system, the mobile communication system comprising a core network and a radio access network, wherein in the mobile communication system, downlink multicast service data of said first multicast service is to be provided to the mobile terminal utilizing a downlink multicast service framework of a second multicast service comprising a downlink multicast service, the method comprising the steps of:
configuring system resources of the mobile communication system for the transmission of multicast service data of the first multicast service, wherein the configuring of the system resources comprises the establishment of a bidirectional radio bearer between the mobile terminal and a control entity controlling radio resources of the radio access network,
deciding whether to utilize a point-to-point connection on the radio access network to provide the downlink multicast service data of the first multicast service to the mobile terminal, and
configuring system resources of the downlink multicast service framework of the second multicast service for the transmission of the downlink multicast service data of the first multicast service to utilize the bidirectional radio bearer, established for the first multicast service, to provide the downlink multicast service data of the first multicast service to the mobile terminal, in case it has been decided to utilize a point-to-point connection,
wherein the first multicast service is an IMS service and the multicast service framework of the second multicast service is provided by an MBMS service.

2. The method of claim 1, wherein the step of configuring the system resources of the mobile communication system for the transmission of the multicast service data of the first multicast service further includes the establishment of a connection between a network entity in the core network and the control entity in the radio access network.

3. The method of claim 2, wherein the step of configuring the system resources of the downlink multicast service framework of the second multicast service for the transmission of the downlink multicast service data is effected by the network entity of the core network.

4. The method of claim 3, wherein the step of configuring the system resources of the downlink multicast service framework of the second multicast service for the transmission of the downlink multicast service data further utilizes the established connection between the network entity and the control entity to provide the downlink multicast service data.

5. The method of claim 1, wherein the first multicast service is assigned a multicast service identifier.

6. The method of claim 5, wherein the multicast service identifier is an Access Point Name or an Internet Protocol multicast address.

7. The method of claim 2, wherein the step of configuring the system resources of the mobile communication system for the transmission of the multicast service data of the first multicast service further includes activating a context for multicast service related control signaling and for multicast service data transfer at least in the network entity of the core network, the context including routing information on routing of the multicast service data in the configured system resources to provide the first multicast service from the multicast service provider to the mobile terminal and including a multicast service identifier.

8. The method of claim 2, wherein the step of configuring the system resources of the mobile communication system for the transmission of the multicast service data of the first multicast service further includes activating a control signaling context for multicast service related control signaling including routing information on routing of control signaling in the configured system resources and including a multicast service identifier and activating a data context for multicast service data transfer including routing information on the routing of multicast service data provided from the multicast service provider to the mobile terminal in the configured system resources being identified by a resource identifier and including a multicast service identifier at least in the network entity of the core network.

9. The method of claim 2, wherein the step of configuring the system resources of the downlink multicast service framework of the second multicast service for the transmission of the downlink multicast service data includes activating a mobile terminal related context of the downlink multicast service framework at least in the network entity of the core network, the mobile terminal related context including information on the mobile terminal and information on downlink multicast services the mobile terminal is registered to.

10. The method of claim 7, further comprising the step of identifying the mobile terminal, which is provided with the first multicast service and uses the downlink multicast service framework for provision of the downlink multicast service data by comparing the multicast service identifier comprised in the control signaling context and the context.

11. The method of claim 1, further comprising the step of identifying the system resources used for the multicast service data of the bidirectional multicast service.

12. The method of claim 1, further comprising the step of identifying by a network entity of the core network the system resources configured for the multicast service data of the first multicast service and utilizing the bidirectional radio bearer of the identified system resources to provide the downlink multicast service data.

13. The method of claim 12, further comprising the step of utilizing a connection between the network entity in the core network and the control entity of the radio access network to provide the downlink multicast service data.

14. The method of claim 8, further comprising the step of identifying the system resources utilized for the multicast service data of the first multicast service based on the resource identifier of the data context of the bidirectional multicast service.

15. The method of claim 5, wherein the multicast service identifier is unique to a multicast service utilizing the downlink multicast service framework to provide the downlink multicast service data.

16. The method of claim 15, further comprising the step of identifying the mobile terminal, which is provided with the multicast service, based on the unique multicast service identifier.

17. The method of claim 2, wherein the deciding of whether to utilize the point-to-point connection is made by the control entity and the method further comprises the steps of:
  informing the control entity, by the network entity in the core network, on the mobile terminal having requested the bidirectional multicast service, and
  transmitting a notification message to the network entity in the core network to inform the network entity on the deciding of whether to utilize the point-to-point connection, the notification message comprising information on the mobile terminal to be utilizing the point-to-point connection and information on the bidirectional multicast service.

18. The method of claim 2, wherein the connection between the network entity of the core network and the control entity is a tunnel and wherein an endpoint of the tunnel is identified by a tunnel endpoint identifier included in a context for a multicast service data transfer.

19. The method of claim 18, wherein the step of configuring the system resources of the downlink multicast service framework of the second multicast service for the transmission of the downlink multicast service data includes assigning the tunnel endpoint identifier of the established tunnel to the downlink multicast service data.

20. The method of claim 2, wherein the network entity is a gateway General Packet Radio Service (GPRS) support node or a serving GPRS support node in the core network.

21. The method of claim 1, wherein the step of configuring the system resources of the downlink multicast service framework of the second multicast service for the transmission of the downlink multicast service data on the radio access network is effected by the control entity.

22. The method of claim 21, wherein the bidirectional radio bearer, established for the first multicast service, is addressed by a radio bearer identifier and the step of configuring the system resources of the downlink multicast service framework of the second multicast service for the transmission of the downlink multicast service data includes assigning the radio bearer identifier to the downlink multicast service data.

23. The method of claim 1, wherein said first multicast service is provided to additional mobile terminals within the mobile communication system utilizing the downlink multicast service framework to provide the downlink multicast service data to the additional mobile terminals and wherein system resources are configured for the transmission of multicast service data of said first multicast service to the additional mobile terminals and the method further comprises the steps of:
  transmitting the downlink multicast service data to the additional mobile terminals via the system resources configured for the additional mobile terminals and
  transmitting the downlink multicast service data to the mobile terminal via the system resources configured for the mobile terminal.

24. The method of claim 23, wherein the configured system resources for the additional mobile terminals include a tunnel between a network entity of the core network and the control entity of the radio access network, and a point-to-multipoint connection between the control entity and the additional mobile terminals in the radio access network.

25. The method of claim 23, wherein the configured system resources for the additional mobile terminals include a point-to-multipoint connection between the control entity and the additional mobile terminals in the radio access network.

26. The method of claim 1, wherein the first multicast service is identified by a multicast service identifier and the method further comprises the step of:
  transmitting an activation message from the mobile terminal to a downlink multicast service server to activate a downlink multicast service to be used for the transmission of downlink multicast service data utilizing the system resources configured for the multicast service data of the bidirectional multicast service.

27. The method of claim 26, further comprising the steps of:
  authorizing the mobile terminal to receive the downlink multicast service data by the downlink multicast service server, and
  if authorization is successful, receiving by a network entity of the core network a notification including the multicast service identifier of the bidirectional multicast service, to identify the system resources configured for the transmission of service data of the bidirectional multicast service.

28. The method of claim 26, wherein a control signaling context for multicast service related control signaling, including routing information on the routing of control signaling in the configured system resources or a data context for multicast service data transfer, including routing information on the routing of multicast service data provided from the multicast service provider to the mobile terminal in the configured system resources is used to identify the connection via which the activation message from the mobile terminal to the downlink multicast service server is transmitted.

29. The method of claim 1, wherein the mobile terminal is located in a source cell, and wherein the first multicast service is provided to additional mobile terminals within the mobile communication system, located in a target cell, wherein in the target cell system resources are configured for providing service data of the first multicast service to the additional mobile terminals and the method further comprises the steps of:
  utilizing the configured system resources of the target cell to provide the first multicast service to the mobile terminal, and releasing the configured system resources configured for the mobile terminal in the source cell, when handing over the mobile terminal from the source cell to the target cell.

30. The method of claim 29, wherein the configured system resources in the target cell include an established point-to-multipoint connection between a control entity of the radio access network and the additional mobile terminals, and the step of utilizing the configured system resources of the target cell comprises transmitting the downlink multicast service data to the mobile terminal via the established point-to-multipoint connection for the additional mobile terminals, and the method further comprises the step of:

notifying the control entity of the radio access network to release a configured radio bearer for the mobile terminal in the source cell.

31. The method of claim 29, wherein the configured system resources in the target cell include an established connection between a network entity of the core network and the control entity of the radio access network and a point-to-multipoint connection between the control entity of the radio access network and the additional mobile terminals, and the step of utilizing the configured system resources in the target cell comprises transmitting the downlink multicast service data to the mobile terminal utilizing the established connection and the established point-to-multipoint connection for the additional mobile terminals, and the method further comprises the steps of:

notifying the network entity of the core network to release a configured connection between the network entity and the control entity for the mobile terminal in the source cell, and notifying the control entity of the radio access network to release a configured radio bearer for the mobile terminal in the source cell.

32. A method for providing a first multicast service, including the provision of uplink and downlink data packets to a user equipment within a mobile communication system, wherein the first multicast service uses a downlink multicast capable service mechanism of a second multicast service comprising a downlink multicast service for transmitting downlink multicast service data packets to the user equipment, the method comprising the steps of:

configuring network resources of the mobile communication system to establish an uplink path for the transmission of the uplink data packets of the first multicast service from to the user equipment, wherein the configuring of the network resources includes setting up of a bidirectional radio connection between the user equipment and a control element controlling radio resources of a radio access network, deciding whether to set up a point-to-point link on the radio access network for the transmission of the downlink data packets to the user equipment, and if it has been decided to set-up the point-to-point link, configuring the downlink multicast capable service mechanism of the second multicast service so as to use the configured bidirectional radio connection of an uplink multicast service data configuration for the transmission of the downlink data packets, wherein the first multicast service is an IMS service and the downlink multicast service of the second multicast service is provided by an MBMS service.

33. A network entity for configuring system resources, said network entity being part of a radio access network in a mobile communication system, wherein downlink multicast service data of a first multicast service comprising a bidirectional multicast service is to be provided to a mobile terminal utilizing a second multicast service comprising a downlink multicast service, said network entity comprising:

a processor to configure system resources of the downlink multicast service framework of the second multicast service of the mobile communication system for the transmission of multicast service data of the first multicast service from a multicast service provider to the mobile terminal, wherein the configuration comprises the establishment of a bidirectional radio bearer between the mobile terminal and a control entity controlling radio resources of the radio access network, wherein:

the processor is further configured to decide whether to utilize point-to-point connection on the radio access network to provide the downlink multicast service data of the first multicast service to the mobile terminal, and the network entity further comprises a receiver to receive the downlink multicast service data and forward the downlink multicast service data through the bidirectional radio bearer, established for the first multicast service, in case it has been decided to utilize the point-to-point connection, wherein the first multicast service is an IMS service and the downlink multicast service of the second multicast service is provided by an MBMS service.

34. A network entity for configuring system resources, said network entity being part of a core network in a mobile communication system, wherein downlink multicast service data of a first multicast service comprising a bidirectional multicast service is to be provided to a mobile terminal utilizing a second multicast service comprising a downlink multicast service, said network entity comprising:

a processor to configure system resources of the mobile communication system for the transmission of multicast service data of the first multicast service from a multicast service provider to the mobile terminal, wherein the configuration comprises the establishment of a tunnel between the network entity and a control entity controlling radio resources of the radio access network, the processor being further configured to request the control entity to reserve system resources for the establishment of a radio bearer between the control entity and the mobile terminal for the transmission of the multicast service data of the first multicast service and to inform the control entity on the mobile terminal having requested the first multicast service, the network entity further comprises a receiver to receive in said network entity a notification message from the control entity in the radio access network on whether to utilize a point-to-point connection, the notification message comprising an identification of the mobile terminal to be utilizing the point-to-point connection and an identification of the first multicast service, and the receiver further receives downlink multicast service data and forwards the downlink multicast service data through the established tunnel of the first multicast service, to utilize the bidirectional radio bearer, established for the first multicast service, in case it has been decided to utilize the point-to-point connection, wherein the first multicast service is an IMS service and the downlink multicast service of the second multicast service is provided by an MBMS service.

35. A network entity for configuring system resources, said network entity being part of a radio access network in a mobile communication system, the configured system resources being utilized for setting up a first multicast service comprising a bidirectional multicast service from a multicast service provider to a mobile terminal, wherein downlink multicast service data of said first multicast service is to be provided to the mobile terminal utilizing a second multicast service comprising a downlink multicast service, said network entity comprising:

a processor to configure system resources of the mobile communication system for the transmission of multicast service data of the first multicast service from a multicast service provider to the mobile terminal, wherein the configuration comprises the establishment of a radio bearer to the mobile terminal, a receiver to receive a notification from a network entity of a core network in the mobile communication system, including information on the mobile terminal having requested the first multicast service, the processor further configured to decide whether to utilize a point-to-point connection on the radio access network to provide the downlink multicast service data to the mobile terminal, a transmitter to transmit a notification to the network entity, the notification message comprising an identification of the mobile terminal to be utilizing the point-to-point connection and an identification of the first multicast service, and wherein the network entity is further configured to receive the downlink multicast service data and forward the downlink multicast service data through the bidirectional radio bearer, established for the first multicast service, in case it has been decided to utilize the point-to-point connection, wherein the first multicast service is an IMS service and the downlink multicast service of the second multicast service is provided by an MBMS service.

36. The network entity of claim 33, the processor further configured to perform the steps of a method for setting up a bidirectional multicast service from a multicast service provider to the mobile terminal within a mobile communication system, the mobile communication system comprising a core network and a radio access network, wherein in the mobile communication system downlink multicast service data of said bidirectional multicast service is to be provided to the mobile terminal utilizing a downlink multicast service framework, the method comprising the steps of:

configuring system resources of the mobile communication system for the transmission of multicast service data of the bidirectional multicast service, wherein the configuration comprises the establishment of a bidirectional radio bearer between the mobile terminal and a control entity controlling radio resources of the radio access network, deciding whether to utilize a point-to-point connection on the radio access network to provide the downlink multicast service data of the multicast service to the mobile terminal, and configuring the system resources of the downlink multicast service framework for the transmission of the downlink multicast service data to utilize the bidirectional radio bearer, established for the first multicast service, for providing the downlink multicast service data to the mobile terminal, in case it has been decided to utilize the point-to-point connection, wherein the step of configuring the system resources of the mobile communication system for the transmission of multicast service data of the bidirectional multicast service further includes the establishment of a connection between a network entity in the core network and the control entity in the radio access network.

37. A mobile communication system for setting up a bidirectional multicast service from a multicast service provider to a mobile terminal, further comprising at least a network entity according to claim 33.

38. A mobile terminal within a mobile communication system for participating in a first multicast service comprising a bidirectional multicast service provided by a multicast service provider, wherein in the mobile communication system downlink multicast service data of said bidirectional multicast service is to be provided to a mobile terminal utilizing a second multicast service comprising a downlink multicast service, the mobile terminal comprising:

a processor to configure system resources in the mobile communication system, including a radio bearer to a control entity in a radio access network for the transmission and reception of service data of the first multicast service, wherein the processor further configures system resources in the mobile communication system for the reception of downlink multicast service data through the second multicast service and receives downlink service data through the bidirectional radio bearer, established for the first multicast service, in case a point-to-point connection is established in the radio access network, wherein the first multicast service is an IMS service and the downlink multicast service of the second multicast service is provided by an MBMS service.

* * * * *